(12) United States Patent
Richardson

(10) Patent No.: US 11,974,545 B1
(45) Date of Patent: *May 7, 2024

(54) HORSE TRAINING APPARATUS WITH HOPPERS, AN ADJUSTMENT MEMBER, AND A NOTCHED DISK LATCH

(71) Applicant: Robert D. Richardson, Scottsdale, AZ (US)

(72) Inventor: Robert D. Richardson, Scottsdale, AZ (US)

( * ) Notice: Subject to any disclaimer, the term of this patent is extended or adjusted under 35 U.S.C. 154(b) by 101 days.

This patent is subject to a terminal disclaimer.

(21) Appl. No.: 17/833,187

(22) Filed: Jun. 6, 2022

Related U.S. Application Data

(63) Continuation of application No. 17/207,269, filed on Mar. 19, 2021, now Pat. No. 11,350,608.

(51) Int. Cl.
*A01K 15/02* (2006.01)
*A01K 1/00* (2006.01)
*A01K 1/06* (2006.01)

(52) U.S. Cl.
CPC .......... *A01K 15/027* (2013.01); *A01K 1/0029* (2013.01); *A01K 1/0613* (2013.01); *A01K 15/02* (2013.01)

(58) Field of Classification Search
CPC .. A01K 15/027; A01K 1/0029; A01K 1/0613; A01K 15/02; A01K 5/0225; A45C 13/1084

USPC .......................................... 74/491; 119/702
See application file for complete search history.

(56) References Cited

U.S. PATENT DOCUMENTS

| | | | | | |
|---|---|---|---|---|---|
| 3,942,477 | A | * | 3/1976 | Richardson | A01K 15/027 119/516 |
| 4,050,415 | A | * | 9/1977 | Conger | A01K 5/0225 119/51.5 |
| 2008/0271815 | A1 | * | 11/2008 | Guardia | A01K 5/0225 141/344 |
| 2010/0180825 | A1 | * | 7/2010 | Kleinsasser | A01K 5/0225 119/53 |
| 2014/0130746 | A1 | * | 5/2014 | Kleinsasser | A01K 5/00 119/51.5 |

* cited by examiner

*Primary Examiner* — Brady W Frazier
*Assistant Examiner* — Zoe Tam Tran
(74) *Attorney, Agent, or Firm* — Parsons & Goltry, PLLC; Robert A. Parsons; Michael W. Goltry

(57) ABSTRACT

Apparatus for training horses includes a housing including a lower section under an upper section, the lower section configured with a stall for confining a horse and having opposed sides, and the upper section including a tank for loose granular material and configured with a hopper proximate to each of the sides, the hoppers concurrently openable for releasing the loose granular material into the lower section from above the stall along the respective sides for sufficiently filling the stall with the loose granular material for covering at least a portion of the horse.

6 Claims, 27 Drawing Sheets

HORSE TRAINING APPARATUS WITH HOPPERS, AN ADJUSTMENT MEMBER, AND A NOTCHED DISK LATCH

FIELD OF THE INVENTION

The present invention relates generally to horse training apparatus and methods and, more particular, to apparatus and methods for covering at least a part of a horse in loose granular material for training purposes and that are safe for the horse and its trainers.

BACKGROUND OF THE INVENTION

Practices intended to develop behaviors of horses when commanded to do so by humans characterizes horse training. Horses are trained to be manageable by humans for everyday care, equestrian activities, recreational activities, specialized jobs, etc. Controversy exists over modern horse training methods. While some techniques are considered cruel, others are regarded as gentle and sensitive to horses' inherent intelligence and temperament. The standard initial training of untrained horses, especially a wild or feral horse, involves a process known as "breaking."

"Breaking" a horse means initially taming or training a horse, so it is not dangerous or frightened of people. While one way to break a horse involves using rough handling and unnecessary force, mindful artisans utilize gentle techniques. While gentle breaking methods are well-regarded and ultimately productive, they are time-consuming and, often, expensive, especially when large numbers of horses require breaking.

Accordingly, there is a need in the art for apparatus and methods for training horses for breaking or taming purposes that are efficient, gentle, effectual, safe for both horse and trainer, cost-effective, and useful for breaking large numbers of horses faster than conventional methods.

SUMMARY OF THE INVENTION

According to the invention, an apparatus for training horses for breaking or taming purposes includes a housing having a lower section under an upper section. The lower section is configured with a stall for confining a horse. The stall has opposed sides. The upper section includes a tank for loose granular material. The tank is configured with a hopper proximate to each of the sides. The hoppers are openable for releasing the loose granular material into the lower section from above the stall along the respective sides for sufficiently filling the stall with the loose granular material for covering at least a portion of the horse. In an exemplary embodiment, the loose granular material is grain of an agricultural crop. The agricultural crop is at least one of wheat and barley in an exemplary embodiment, in which the grain is at least one of wheat grain and barely grain. The loose granular material can be sand or, for example, pellets or grains/granules of plastic, wood, or the like, in alternate embodiments. There is an elevator proximate to each of the sides of the stall for re-circulating the loose granular material from the lower section to the tank. Each side of the stall includes a grate enabling grain to pass therethrough between the stall and a collection chamber in the lower section, and each elevator is configured to withdraw the loose granular material from the lower section at the collection chamber. Neither elevator extends into the stall. Each elevator comprises a motor-driven auger assembly. Other forms of elevators are useful in alternate embodiments, such as for example, bucket elevators configured to lift loose granular material from the lower section and deposit it into the tank through, for example, a spout. An adjustment member is mounted to the housing for movement between a hold position and a release position. The adjustment member is mechanically coupled to the hoppers, wherein the hoppers are concurrently closed when the adjustment member is in the hold position, and are enabled to concurrently open when the adjustment member is moved into the release position from the hold position. The adjustment member is mounted for turning between the hold position and the release position. The adjustment member is mechanically coupled to each said closure by at least one coupling each being elongate and flexible and unwinding and winding relative to the adjustment member in response to the adjustment member turning between the hold position and the release position. A latch coupled between the adjustment member and the housing is configured for securing the adjustment member in the hold position and releasing the adjustment member from the hold position. The stall further includes a first end, a second end, and the opposed sides extend longitudinally between the first end and the second end. The hoppers extend longitudinally over the stall from proximate to the first end to proximate to the second end and when opened release the loose granular material into the lower section along the opposed sides from proximate to the first end to proximate to the second end. The first end includes an openable front door, and the second end includes an openable back door. The openable front door and the openable back door are each secured by a latch. The back door includes a head restraint for securing a head of the horse standing in the stall. The back door is exteriorly padded below the head restraint. There is also a goading fixture mounted for reciprocal movement through the stall between a retracted position toward the front door and an extended position away from the front door for consolidating the horse standing in the stall between the goading fixture and the back door. The goading fixture is carried by a frame mounted to the front door for reciprocal movement between a first position and a second position. The goading fixture occupies the retracted position when the frame occupies the first position, the goading fixture occupies the extended position when the frame occupies the second position, and reciprocal movement of the frame between the first position and the second position imparts corresponding reciprocal movement of the goading fixture between the retracted position and the extended position, respectively. The frame extends across the front door from a push member outside of the stall to the goading fixture in the stall. A ratchet strap assembly is coupled between the push member and the front door and is adjustable between a released position enabling movement of the frame between the first position and the second position and an engaged position disabling the movement of the frame from the second position to the first position. The apparatus is self-contained and mobile, enabling it to be easily transported from place-to-place as needed without having to be disassembled in whole or in part.

According to the invention, an apparatus for training horses for breaking or taming purposes includes a housing including a lower section and an upper section. The lower section is configured with a stall for confining a horse. The stall has opposed sides. The upper section includes a tank for loose granular material and configured with a hopper, including dispensing opening and a closure, proximate to each said side, the closures concurrently movable between a closed position closing the dispensing openings for confining the loose granular material in the tank and an open position opening the dispensing openings for allowing the loose granular material to empty therethrough into the lower section from above said stall along the respective sides for sufficiently filling the stall with the loose granular material for covering at least a portion of the horse. In an exemplary embodiment, the loose granular material is grain of an agricultural crop. The agricultural crop is at least one of wheat and barley in an exemplary embodiment, in which the grain is at least one of wheat grain and barely grain. The loose granular material can be sand or, for example, pellets or grains/granules of plastic, wood, or the like, in alternate embodiments. There is an elevator proximate to each said side of the stall for re-circulating the loose granular material from the lower section to the tank. Each side of the stall includes a grate enabling grain to pass therethrough between the stall and a collection chamber, and each elevator is configured to withdraw the loose granular material from the lower section at the collection chamber. Neither elevator extends into the stall. Each elevator is a motor-driven auger assembly. Other forms of elevators are useful in alternate embodiments, such as for example, bucket elevators configured to lift loose granular material from the lower section and deposit it into the tank through, for example, a spout. The closures are doors each mounted for turning between the closed position thereof raised away from the stall and the open position thereof lowered toward the stall. An adjustment member is mounted to the housing for movement between a hold position and a release position. The adjustment member is mechanically coupled to the doors, wherein the doors are concurrently closed when the adjustment member is in the hold position, and are enabled to concurrently turn out of the closed positions thereof to the open positions thereof when the adjustment member is in the release position. The adjustment member is mounted for turning between the hold position and the release position, and the adjustment member is mechanically coupled to each door by at least one coupling each being elongate and flexible and unwinding and winding relative to the adjustment member in response to the adjustment member turning between the hold position and the release position. A latch coupled between the adjustment member and the housing is configured for securing the adjustment member in the hold position and releasing the adjustment member from the hold position. The stall further includes a first end, a second end, and the opposed sides extend longitudinally between the first end and the second end. The dispensing openings extend longitudinally over the stall from proximate to the first end to proximate to the second end and when opened release the loose granular material into the lower section along the opposed sides from proximate to the first end to proximate to the second end. The first end includes an openable front door, and the second end includes an openable back door. The openable front door and the openable back door are each secured by a latch. The back door includes a head restraint for securing a head of the horse standing in the stall. The back door is exteriorly padded below the head restraint. There is also a goading fixture mounted for reciprocal movement through the stall between a retracted position toward the front door and an extended position away from the front door for consolidating the horse standing in the stall between the goading fixture and the back door. The goading fixture is carried by a frame mounted to the front door for reciprocal movement between a first position and a second position. The goading fixture occupies the retracted position when the frame occupies the first position, the goading fixture occupies the extended position when the frame occupies the second position, and reciprocal movement of the frame between the first position and the second position imparts corresponding reciprocal movement of the goading fixture between the retracted position and the extended position, respectively. The frame extends across the front door from a push member outside of the stall to the goading fixture in the stall. A ratchet strap assembly is coupled between the push member and the front door and is adjustable between a released position enabling movement of the frame between the first position and the second position and an engaged position disabling the movement of the frame from the second position to the first position. The apparatus is self-contained and mobile, enabling it to be easily transported from place-to-place as needed without having to be disassembled in whole or in part.

BRIEF DESCRIPTION OF THE DRAWINGS

Specific objects and advantages of the invention will become readily apparent to those skilled in the art from the following detailed description of illustrative embodiments thereof, taken in conjunction with the drawings in which.

DETAILED DESCRIPTION

Figure 1:
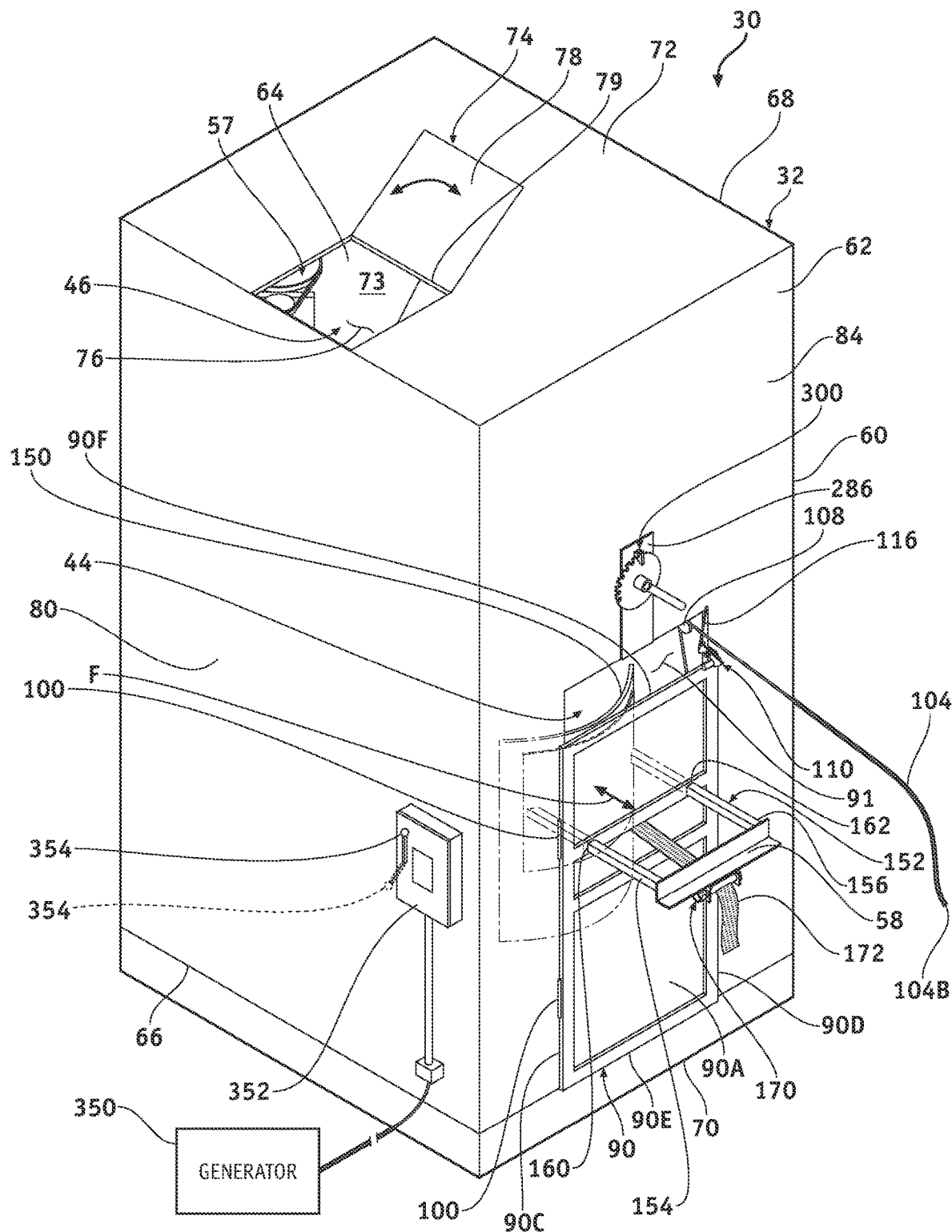
FIG. 1 is a front perspective view of an apparatus for training a horse for breaking or taming purposes, the apparatus including a housing having an openable front door shown closed and secured by a front-door latch closing an entryway to a stall within the housing, a goading fixture carried by a frame mounted to the front door for movement between retracted and extended positions of the goading fixture within the stall, and a ratchet strap assembly coupled between the frame and the front door.

Turning now to the drawings, in which like reference characters indicate corresponding elements throughout the several views, attention is directed in relevant part to FIGS. 1, 2, 4, 6, 7, 8, 10, and 14-29, in which there is seen an apparatus 30 for training horses, one at a time, for breaking or taming purposes according to the invention. Apparatus 30 includes a housing 32 of steel, aluminum, or other material or combination of materials having inherently strong, rugged, and resilient material characteristics. Housing 32 includes continuous sidewall 60, having outer surface 62, inner surface 64, lower end 66, and upper end 68, horizontal supporting base 70 at the lower end of housing 32 and which is suitably positionable on the ground, and horizontal top 72 at the upper end of housing 32. Continuous sidewall 60 extends upright from lower end 66 affixed to base 70 to upper end 68 affixed to top 72. Base 70 and top 72 cooperate with inner surface 64 of continuous sidewall 60 to form a volume 73 within housing 32 and within which are housed and enclosed various components of apparatus 30 described with particularity herein. Continuous sidewall 60 includes axially spaced-apart, upright, and parallel side walls 80 and 82 that extend between axially spaced-apart, upright, and parallel front and back walls 84 and 86. Walls 80, 82, 84, and 86 are substantially coextensive in this example, and concurrently extend upright from base 70 to top 72.

Volume 73 includes two main sections: a lower section, generally denoted at 40, and an upper section, generally denoted at 42. Lower section 40 is directly under upper section 42, and is configured with a stall 44 for confining a horse H standing therein directly under upper section 42. Upper section 42 directly over lower section 40 is configured with a tank 46 for loose granular material 35, hereinafter referred to simply as "material." Top 72 cooperates with inner surface 64 of continuous sidewall 60 and a bottom 48, preferably of the same material as housing 32, between top 72 and base 70 of housing 32 dividing lower section 40 from upper section 40 to form tank 46. Tank 6 is exemplary of a bulk tank. Bottom 48 at an intermediate location between top 72 and bottom 70 of housing 32 is affixed to and extends inwardly from inner surface 64 of housing 30, and is configured as hoppers 50 and 52 supported over and above stall 44. Hoppers 50 and 52 are each a funnel-shaped chamber or bin in which material 35 is stored, being filled through the opened hatch 74 of top 72, and dispensed through bottom 48 into lower section 40.

Stall 44 includes a horizontal platform or floor 54 and opposed, parallel side walls 55 and 56 projecting upright from either side of floor 54 to hoppers 50 and 52, respectively. Upright side wall 55 defines one side of stall 44, and upright side wall 56 defines the opposite side of stall 44. Stall 44 extends longitudinally through lower section 40 of housing 32 from front wall 84 to back wall 86. In an exemplary embodiment, material 35 is grain of an agricultural crop. The agricultural crop is at least one of wheat and barley in an exemplary embodiment, in which the grain is at least one of wheat grain and barely grain, being inexpensive, light, and readily available. Material 35 can be sand or, for example, pellets or grains/granules of plastic, wood, or the like, in alternate embodiments.

Hopper 50 is proximate to and above side wall 55, one side of stall 44, and hopper 52 is proximate to and above the opposite side wall 56, the opposite or opposed side of stall 44. Hoppers 50 and 52 are openable in FIG. 23 from being closed in FIG. 22 for releasing material 35 from tank 46 in FIG. 23 into lower section 40 from above stall 44 and directly into stall 44 inboard along its respective sides walls 55 and 56 for sufficiently filling stall 44 with material 35 for covering and thereby immobilizing at least a portion of horse H standing and confined in stall 44 in FIGS. 24, 25, and 26 in material 35, for a duration, such as five minutes, ten minutes, twenty minutes, thirty minutes, or other chosen duration, suitable for breaking or taming purposes. Hoppers 50 and 52 are configured, when opened in FIG. 23 from being closed in FIG. 22, to release material 35 from tank 46 rapidly along the lengths of the respective sides 55 and 56 of stall 44 extending between the opposed ends of stall 44 directly into stall 44 rapidly, within about 5-10 seconds in this example, filling stall 44 with material 35 in an amount sufficient to cover and immobilize at least a portion of horse H in FIGS. 24, 25, and 26 within material 35, while preventing material 35 from falling directly onto the back of horse H standing in stall 44 between its opposed sides defined by side wall 55 and 56 in FIG. 23 to prevent horse H from being unnecessarily startled, in accordance with the invention.

Figure 24:
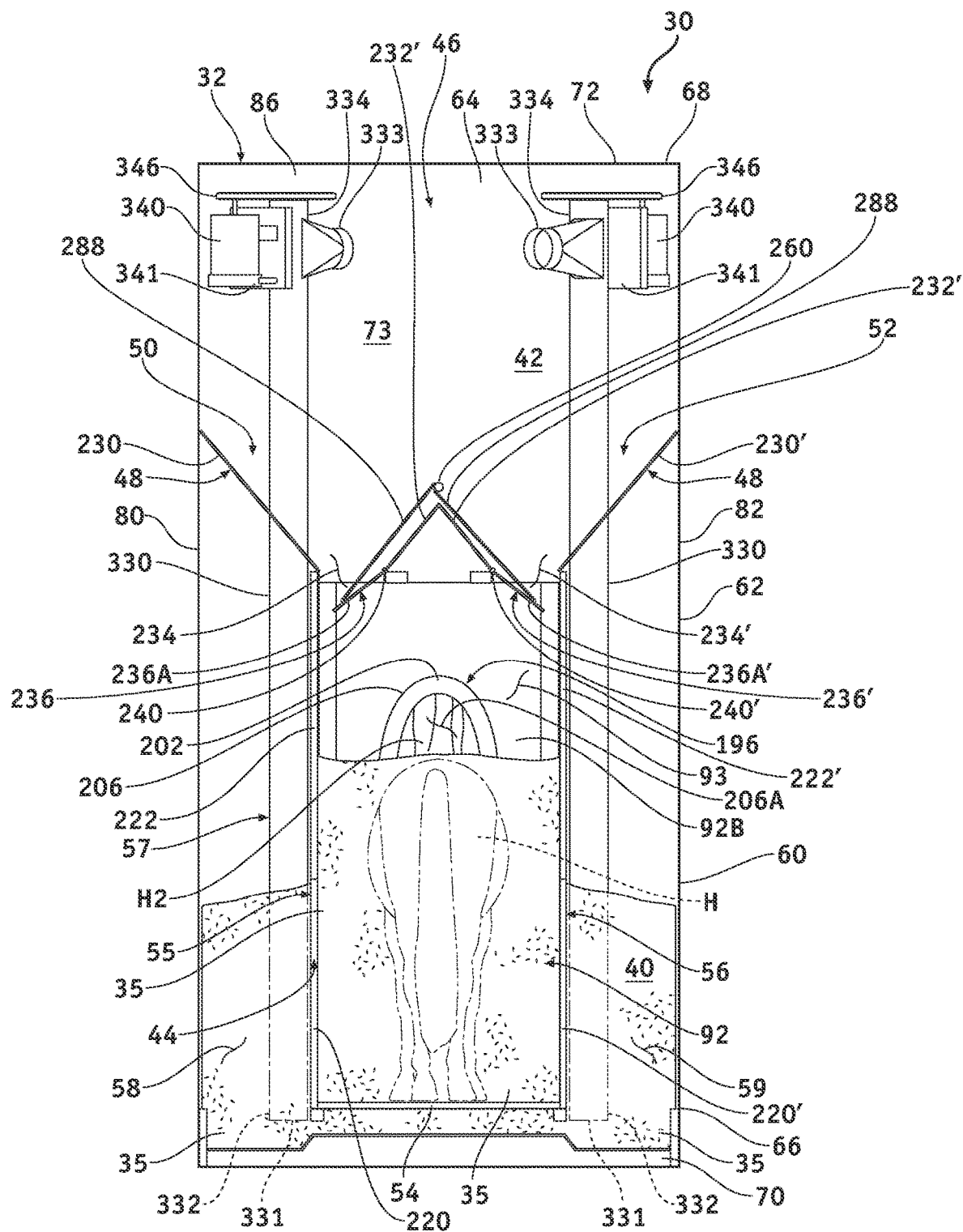
FIG. 24 is a view corresponding to FIG. 22 illustrating the loose granular material deposited into the lower section of the housing from above the stall sufficiently filling the stall with the loose granular material for covering the horse in the stall.
Figure 25:
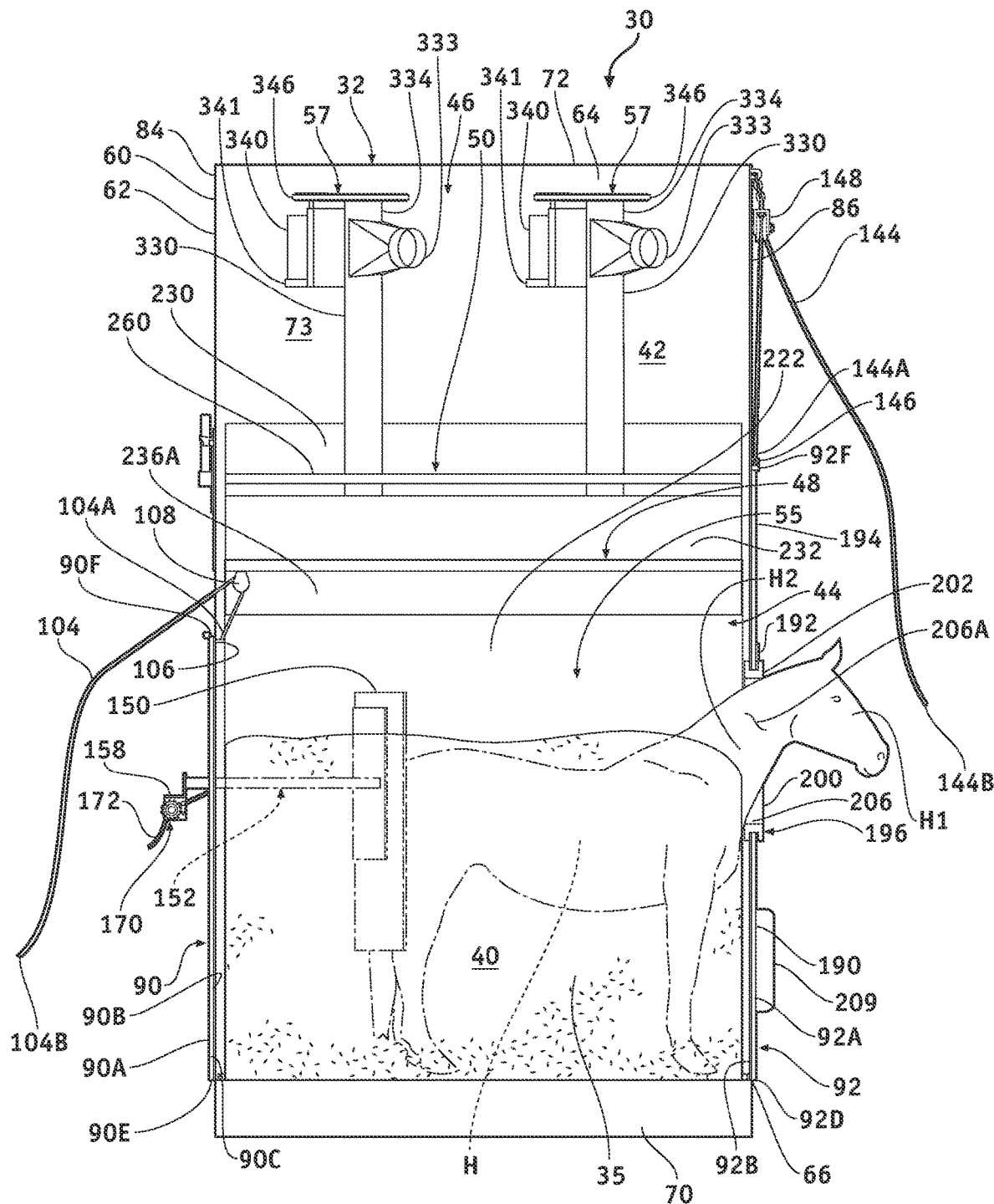
FIG. 25 is a partial cross-section side elevation view corresponding to FIG. 24.
Figure 26:
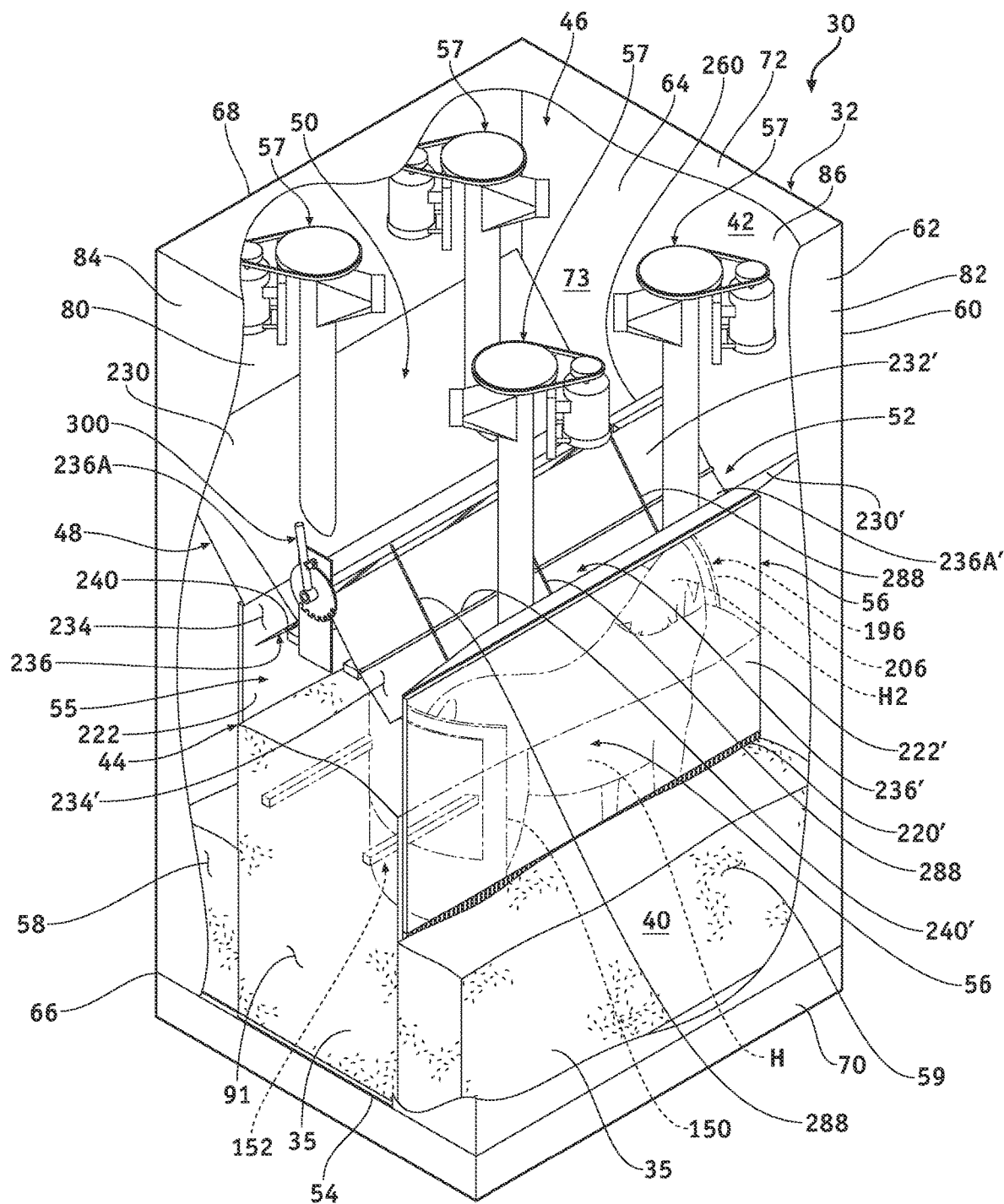
FIG. 26 is a perspective view of the apparatus corresponding to FIGS. 24 and 25 with portions of the housing removed for illustrative purposes.
Figure 27:
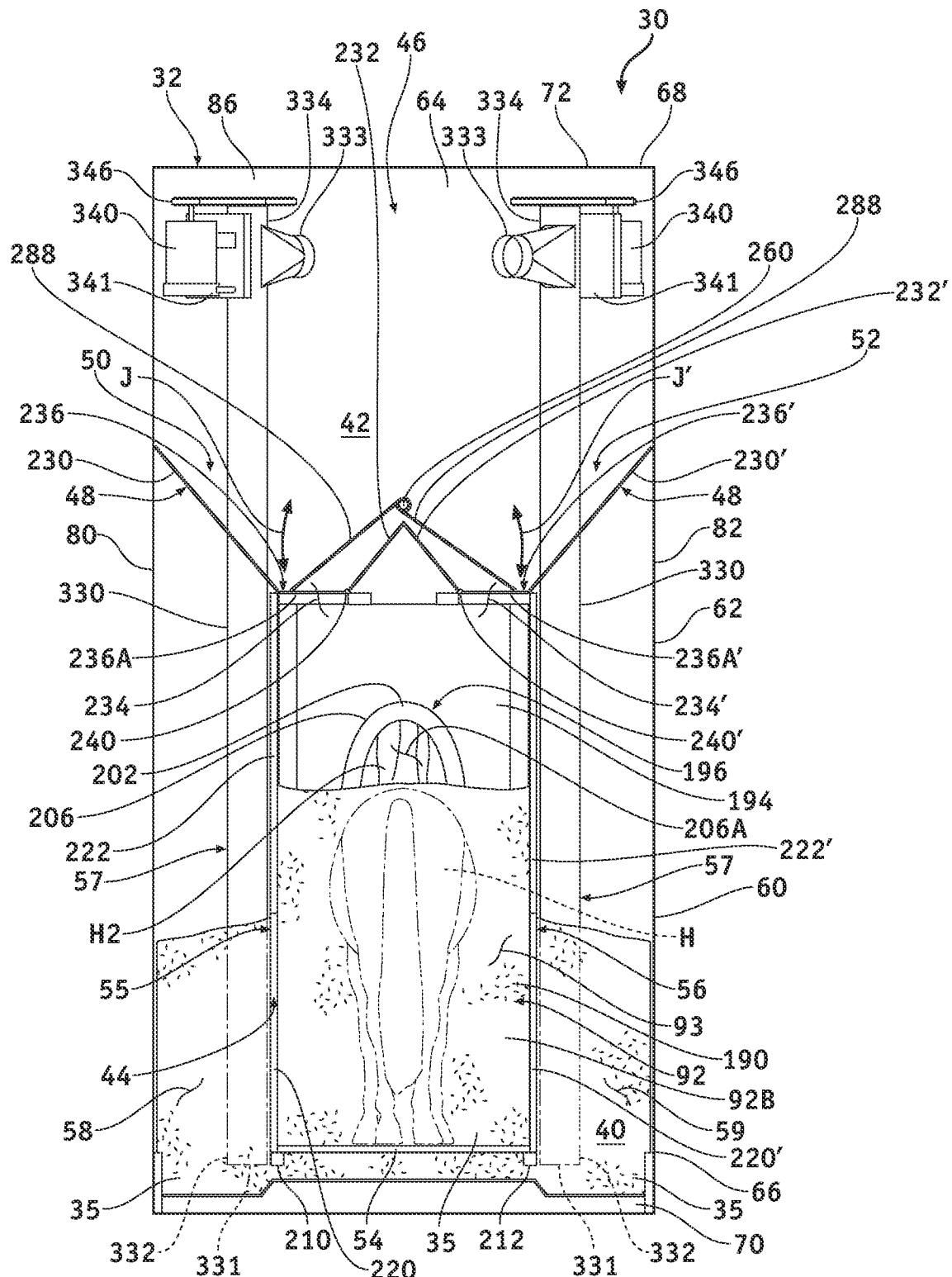
FIG. 27 is a view similar to FIG. 24 illustrating the hoppers closed.

Lower section 40 is configured with collection chambers 58 and 59 on either side of stall 44. Side wall 80, front wall 84, back wall 86, and side wall 55 of stall 44 cooperate with base 70 and bottom 48 to define collection chamber 58 in lower section 40 of volume 73 on the outer side of side wall 55. Side wall 82, front wall 84, back wall 86, and side wall 56 of stall 44 cooperate with base 70 and bottom 48 to define collection chamber 59 on the outer side of side wall 56 in lower section 40 of volume 73. Elevators 57 in volume 73 are operatively coupled between lower section 40 and upper section 53 so that when activated serve to withdraw material 35 from lower section 40, including stall 44, and elevate it back to tank 46 in FIG. 28 for replenishing tank 46 with material 35 for reuse and freeing the horse standing in stall 44 from material 35 at the same time. Accordingly, elevators 57 are configured to evacuate material 35 from lower section 40 including stall 44, and recirculate it back to tank 46. In this example, elevators 57 are operatively coupled between collection areas/chambers 58 and 59 of volume 73 on either side of side walls 55 and 56, which, as described more fully below, are open to collection chambers 58 and 59 for enabling material 35 to pass therethrough from stall 44 to collection chambers 58 and 59. As a result, collection chambers 58 and 59 at least partially fill with material 35 as shown in FIG. 24 that overflows therein from stall 44 at the same time stall 44 fills with material 35 when it is released into lower section 40 from tank 46 in response hoppers 50 and 52 being opened. And so, elevators 57 when activated serve to withdraw material 35 from lower section 40, including stall 44, at collection chambers 58 and 59, and re-circulate it back to tank 46 in FIG. 28. As elevators 57 concurrently work to elevate material 35 from collection chambers 58 and 59 to tank 46, material 35 in stall 44 steadily drains outwardly through the sides of stall 44 by gravity until stall 54 and collection chambers 58 and 59 are substantially emptied of material 35 having been elevated to tank 46 by elevators 57 for reuse.

Top 72 has a hatch 74 shown in FIGS. 1, 2, 4, and 6. Hatch 74 includes a hatchway 76 to tank 46, and door 78. Door 78 is a movable barrier used to open and close hatchway 76, turning on a standard hinge 79 in the opening and closing of hatchway 76. Door 78 turns/pivots on hinge 79 pivotally connecting door 78 to top 72 in the directions of double-arrow A in FIGS. 1, 4, and 6 between an open position in FIGS. 1, 4, and illustrated by the dotted line position of door 78, in which hatch 74 is open enabling loose granular material to be poured into tank 46 within volume 73 through the open hatchway 76, and a closed position in FIGS. 2 and 6, in which hatch 74 is closed disabling access to tank 46 within volume 73 through the closed hatchway 78.

Figure 2:
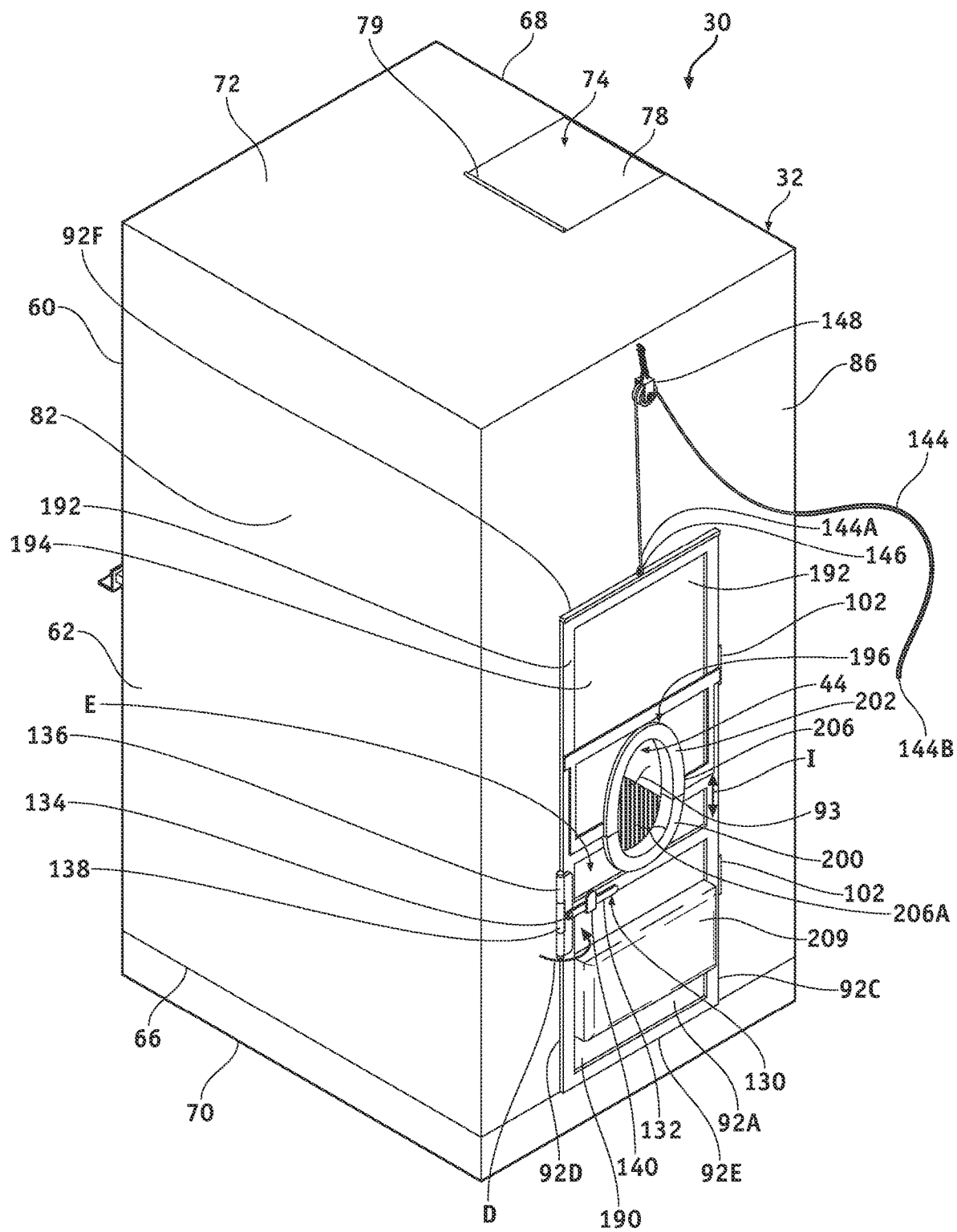
FIG. 2 is a rear perspective view of the embodiment of FIG. 1 illustrating an openable back door shown closed and secured by a back-door latch closing an exitway from the stall, the back door including a head restraint adjustable between an open position for the admission therethrough of a head of a horse and a closed position around a neck of the horse for restraining the horse's head.
Figure 4:
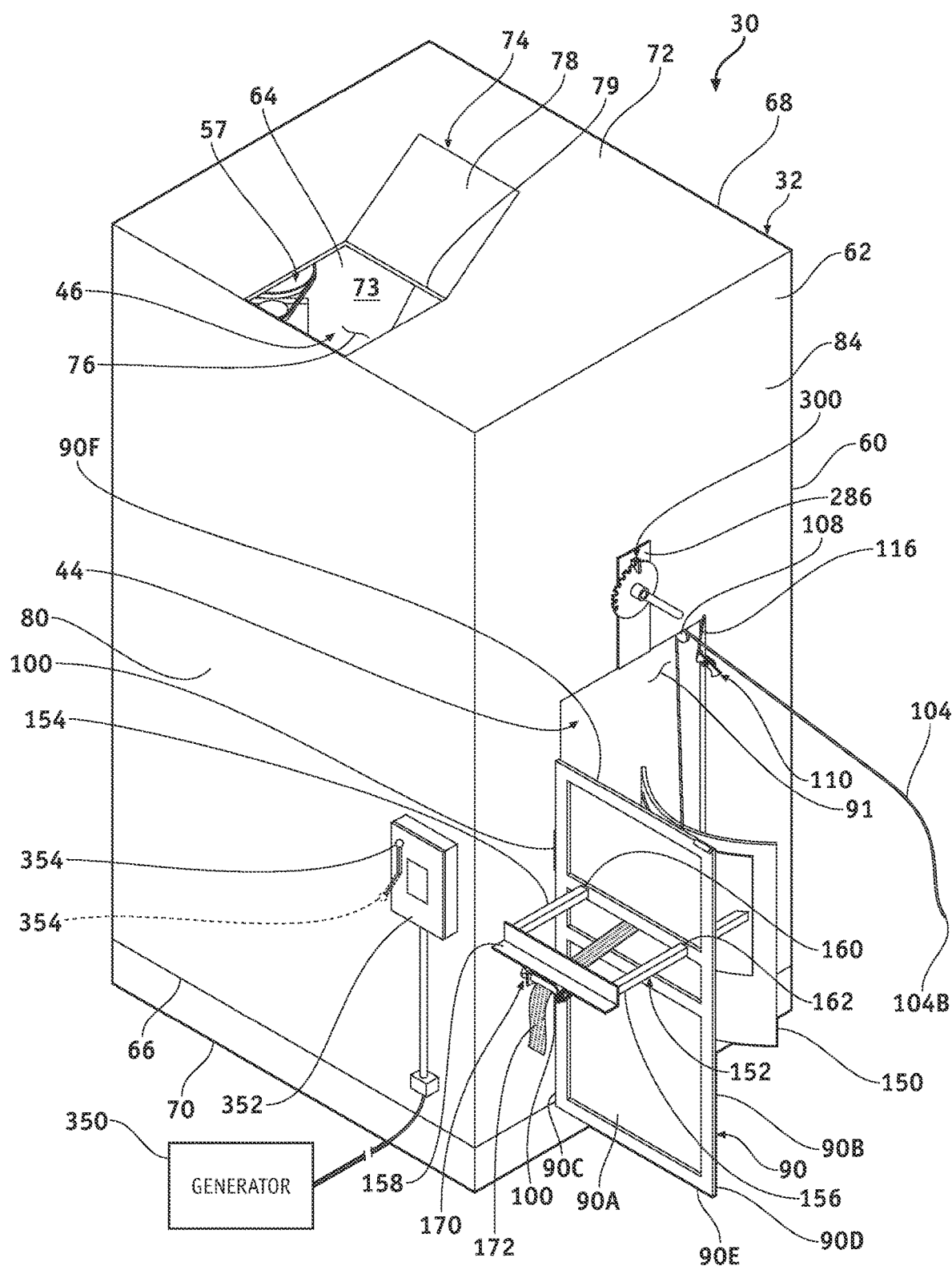
FIG. 4 is a view corresponding to FIG. 1 illustrating the front door released from the front-door latch and opened enabling entry into the stall through the entryway.
Figure 6:
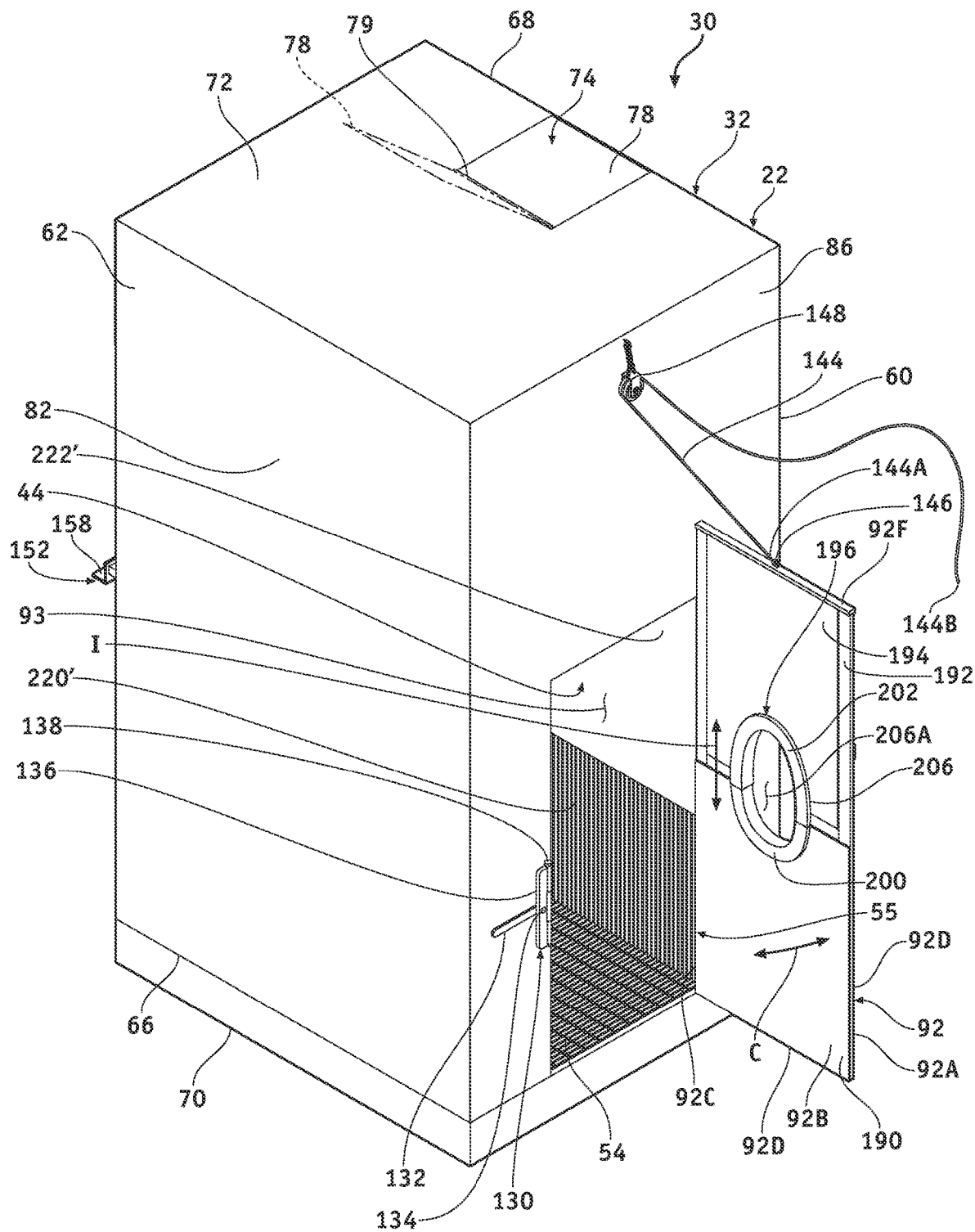
FIG. 6 is a view corresponding to FIG. 2 illustrating the back door released from the back-door latch and opened enabling exit from the stall through the exitway.

Referring to FIGS. 1 and 4, front wall 84 has an entryway 91 to stall 44 at a front or entry end of stall 44 and an openable and closable front door 90 used to open and close entryway 91. As shown in FIGS. 2 and 6, back wall 86 has an exitway 93 from stall 44 at a back or exit end of stall 44, and an openable and closeable back door 92 used to open and close exitway 93. Front door 90 and back door 92 are positioned at the opposite entry and exit ends of stall 44, entryway 91 and exitway 93 are aligned axially, and stall 44 extends longitudinally straight through lower section 40 of housing 32 from entryway 91 through front wall 84 at the entry end of stall 44 to exitway 93 through back wall 86 at the exit end of stall 44.

Figure 14:
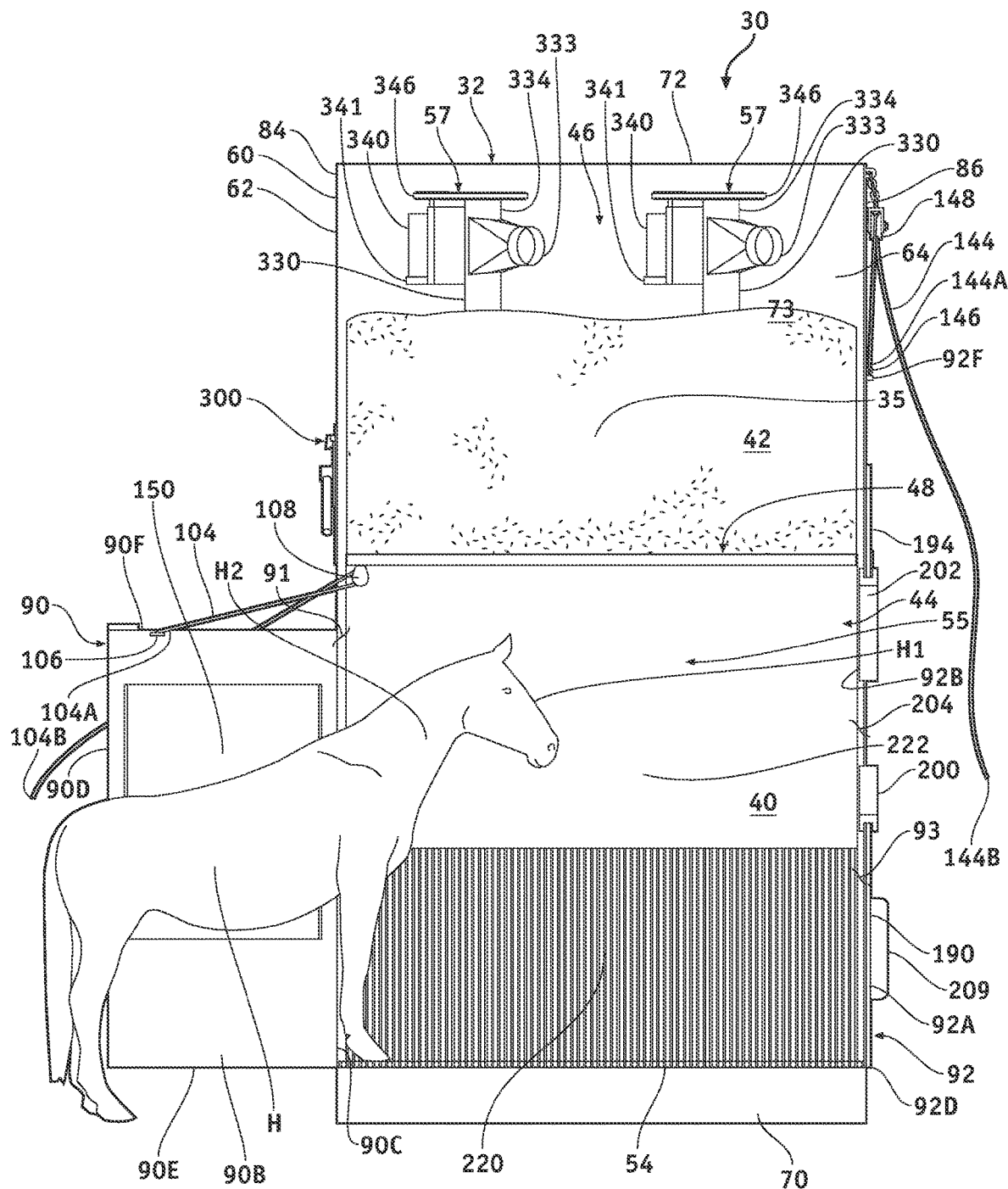
FIG. 14 is a partial cross-section side elevation view of the apparatus of FIGS. 1 and 2 illustrating the front door open opening the entryway to the stall, a horse as it would appear entering the stall through the open entryway, the back door closed closing the exitway from the stall disabling the horse from exiting the stall through the exitway, the head restraint of the back door open for enabling the admission therethrough of the horse's head, and the tank first illustrated in FIGS. 7 and 8 charged with loose granular material.

Referring to FIGS. 1, 4, and 14, front door 90 is a solid, movable barrier used to open and close entryway 91, turning or otherwise pivoting on standard hinges 100 in the opening and closing of front door 90. Front door 90 includes opposed parallel outer/exterior and inner/interior sides 90A and 90B, opposed parallel inner and outer edges 90C and 90D, and opposed parallel lower and upper edges 90E and 90F. Inner and outer edges 90C and 90D extend upright from the respective inner and outer sides of lower edge 90E to the respective inner and outer sides of upper edge 90F. Hinges 100, two in this particular example, hingedly connect inner edge 90C of front door 90 to front wall 84. Front door 90 turns/pivots on hinges 100 in the directions indicated by double-arrow B in FIG. 4 between its closed position in FIG. 1, in which entryway 91 to stall 44 is closed, and an open position in FIG. 4, in which entryway 91 to stall 44 is open. Inner side 90B of front door 90 closes entryway 91 and faces stall 44 in volume 73 of housing 30 when front door 90 is closed.

Figure 16:
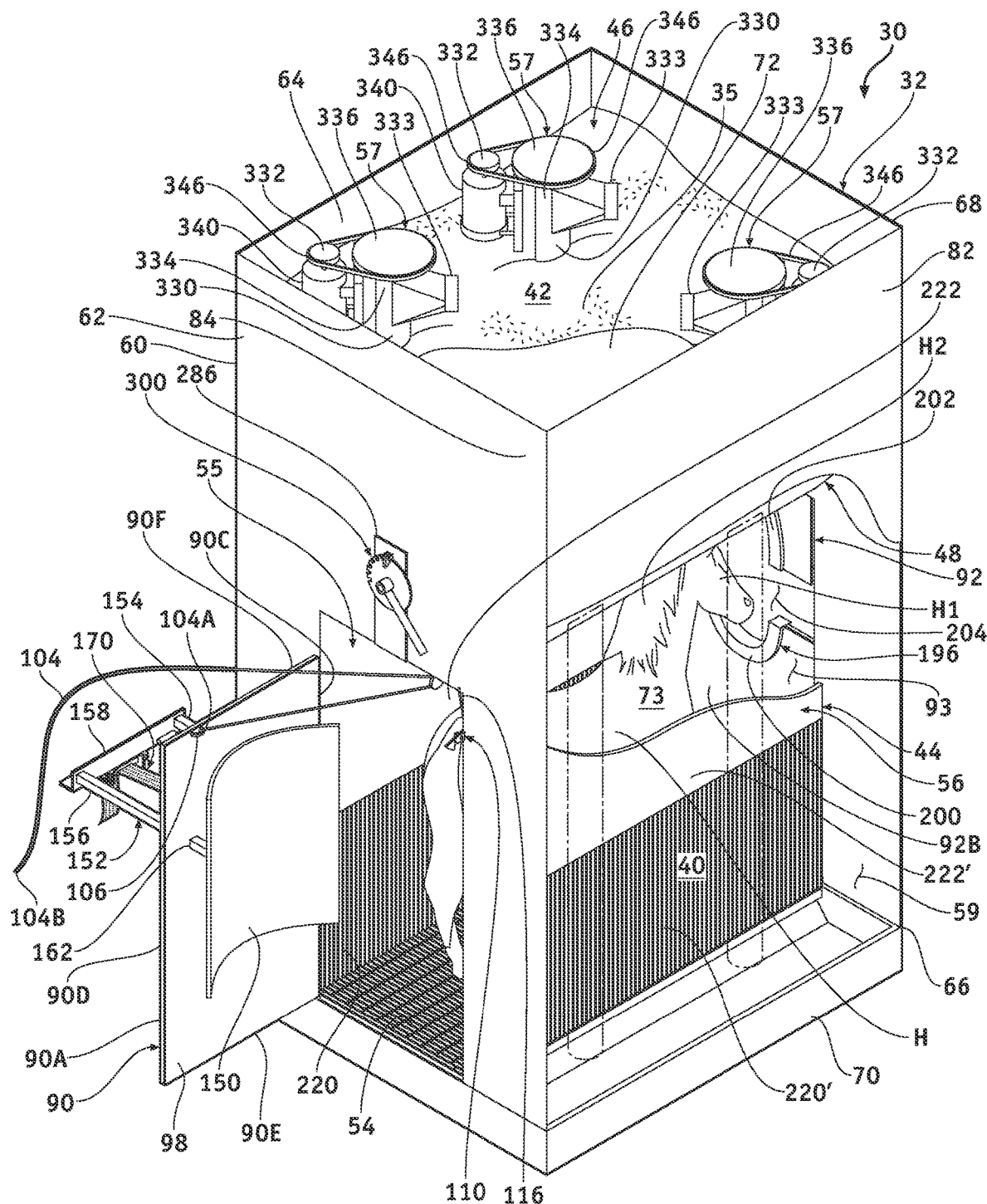
FIG. 16 is a perspective view corresponding to FIG. 14 with portions thereof removed illustrating the horse standing in the stall following its entry into the stall through the open entryway.

Referring to FIGS. 14 and 16, a flexible line 104, such as a rope or cord, has an inner end 104A attached to front door 90 by a standard bracket 106 affixed to front door proximate to upper edge 90F and adjacent to outer edge 90D, and an opposed outer end 104B. Line 104 extends upwardly from inner end 104A to and over a standard pulley 108 affixed to housing 32, bottom 48 proximate to front wall 84 adjacent to entryway 91 in this example, and outwardly from pulley 108 to outer end 104B. Although front door 90 can be closed by hand, front door 90 may alternatively be slammed shut to its closed position in FIGS. 1 and 17 from its open position in FIGS. 4 and 14 simply by forcibly pulling line 104 from its outer end 104B outwardly away from front wall 84 of housing 32, such as by a trainer standing on the ground facing front wall 84. When line 104 is so pulled, line 104 is drawn outwardly over pulley 108 to shut front door 90, forced by the tensioned line 104 pulling on front door 90 between pulley 108 to inner end 104A of line connected to front door 90.

Figure 3:
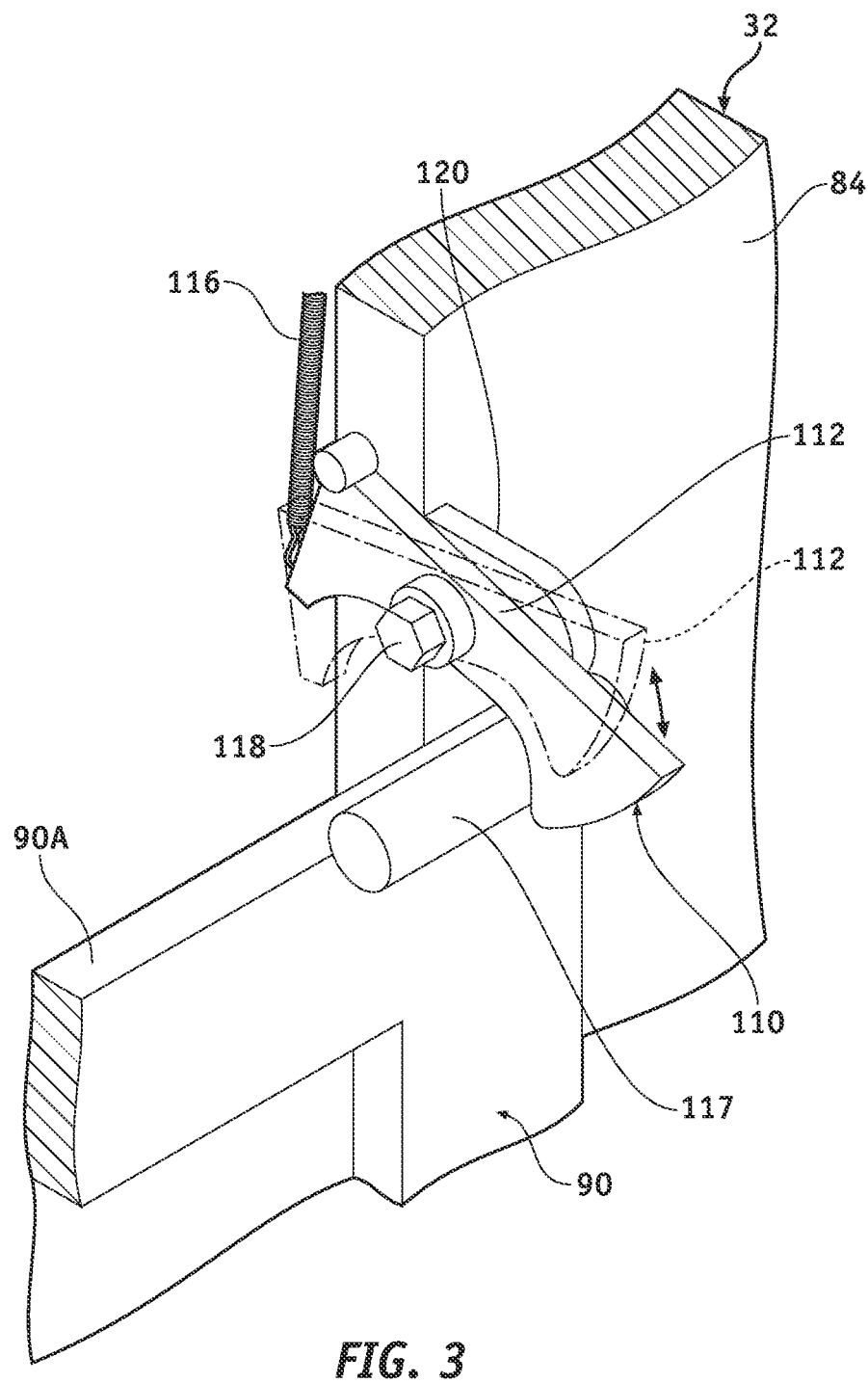
FIG. 3 is an enlarged, fragmentary perspective view corresponding to FIG. 1 illustrating the front door secured in its closed position by the front-door latch including a plunger latched to a catch, and additionally illustrating a dotted line position of the plunger unlatched from the catch for releasing the front door enabling the front door to be opened for opening the entryway to the stall.

A standard front-door latch 110, shown for example in FIGS. 1 and 4, works between front door 90 and front wall 84 of housing 30 for securing front door 90 in its closed position and releasing front door 90 from its closed position for enabling front door 90 to be selectively opened and closed, i.e. out of its open position in FIG. 4 to into its closed position in FIG. 1, and out of its closed position in FIG. 1 to into its open position in FIG. 4. Referring to FIG. 3, latch 110 is a standard spring-loaded gate latch including a plunger 112 hinged to front wall 84 proximate to entryway 91, and catch 114 attached to front door 90 adjacent to its upper edge 90F in this example. Plunger 112 is tensioned or otherwise spring-loaded by at least one spring 116, a tension spring in this example, coupled between plunger 112 and front wall 84 of housing 32 in this example. When front door 90 moves to its closed position, catch 114 strikes plunger 112, which pivotally snaps out of place to its dotted line position in FIG. 3, forced by the impact of catch 114 against plunger 122, enabling front door 90 to close. Upon closing front door 90, plunger 112 automatically pivotally snaps into place in FIG. 3 securing catch 114, forced by the tension of spring 116, thereby securing front door 90 in its closed position. One need only pivot plunger 112, such as by hand, away from catch 114 to release latch 110 for releasing front door 90 from its closed position. In this example, a bolt 118 hinges plunger 112 to a bracket 112 affixed to front wall 84. Those having ordinary skill in the art will readily appreciate that any form of latch configured to positive lock for holding front door 90 closed, basically consisting of a tensioned plunger or bar falling or sliding onto or into a corresponding catch, groove, hole, etc., can be used with front door 90.

Referring to FIGS. 2 and 6, back door 92 is a solid, movable barrier used to open and close exitway 93, turning or otherwise pivoting on standard hinges 102 in the opening and closing of back door 92. Back door 92 includes opposed parallel outer/exterior and inner/interior sides 92A and 92B, opposed parallel inner and outer edges 92C and 92D, and opposed parallel lower and upper edges 92E and 92F. Inner and outer edges 92C and 92D extend upright from the respective inner and outer sides of lower edge 92E to the respective inner and outer sides of upper edge 92F. Hinges 102, two in this particular example, hingedly connect inner edge 92C of back door 92 to back wall 86. Back door 92 turns/pivots on hinges 102 in the directions indicated by double-arrow C in FIG. 6 between a closed position in FIG. 2, in which exitway 93 from stall 44 is closed, and an open position in FIG. 6, in which exitway 93 from stall 44 is open. Inner side 92B of back door 92 closes exitway 93 and faces stall 44 in volume 73 of housing 30 when back door 92 is closed. When front door 90 and back door 92 are closed, stall 44 is closed for confining horse H standing therein. When either front door 90 or back door 92 is open, or when both front door 90 and back door 92 are open, stall 44 is open.

Figure 15:
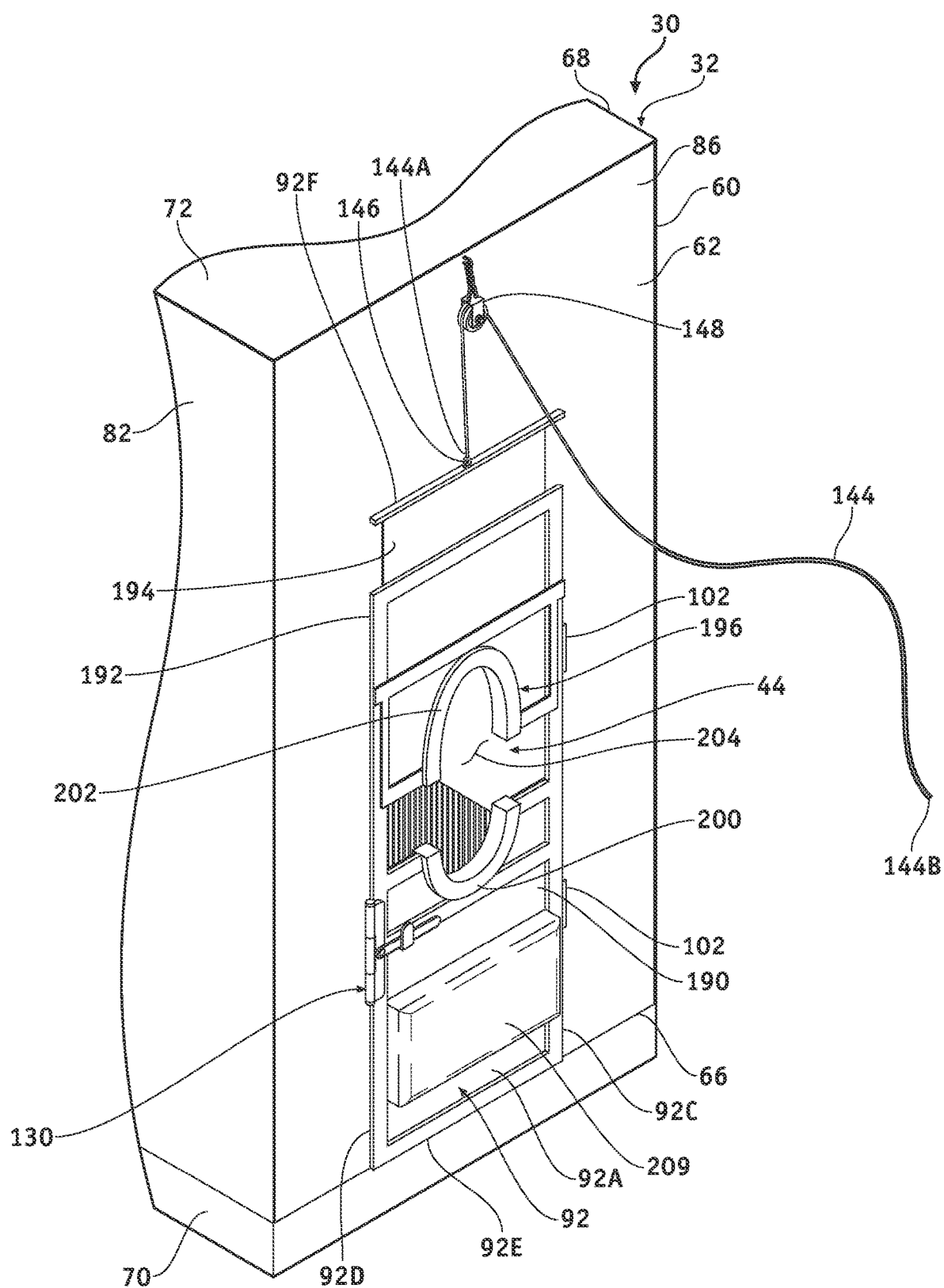
FIG. 15 is a fragmentary perspective view of the apparatus corresponding to FIG. 15 illustrating the head restraint of the back door as it would appear open.

Referring to FIGS. 2, 6, and 15, back door 92 is made up of a solid lower panel 190, a rigid frame 192 extending upright from lower panel 190, a solid upper panel 194 mounted to frame 192, and a head restraint 196 including opposed, semi-circular lower and upper collar segments 200 and 202 formed in the respective lower and upper panels 190 and 194. Lower panel 190, frame 192, and upper panel 194 cooperate to define outer and inner sides 92A and 92B, inner and outer edges 92C and 92D, and lower and upper edges 92E and 92F. One hinge 102 hinges lower panel 190 to back wall 86, and the other hinge 102 hinges frame 192 to back wall 86. Upper panel 194 is mounted to frame 192 for sliding movement, such as by standard suitable races or guideways formed therebetween, in reciprocal directions indicated by double arrowed line I between a lowered position toward lower panel 190 in FIGS. 2 and 6, in which head restraint 196 is closed, and a raised position away from lower panel 190 in FIGS. 15 and 20, in which head restraint 196 is open. When upper panel 194 is raised away from lower panel 190 to its raised or open position in FIGS. 15 and 19, upper collar segment 202 is raised away from lower collar segment 200 defining the open position of head restraint 196, in which lower collar segment 200 and upper collar segment 202 are moved apart to form an area 204 between lower collar segment 200 and upper collar segment 202 suitable for the admission therethrough of a head H1 of horse H. When upper panel 194 is lowered to its lowered or closed position against lower panel 190 in FIGS. 2, 6, and 21, upper collar segment 202 is lowered to lower collar segment 200 defining the closed position of head restraint 196, in which lower collar segment 200 and upper collar segment 202 are moved together to cooperate to define an annular collar 206 configured to "close" around neck H2 of horse H, in which annular collar 206 defines opening 206A through which neck H2 of horse H extends and that serves to encircle neck H2 of horse H extending therethrough in FIG. 21 for restraining or otherwise securing head H1 of horse H. Adjusting head restraint 196 out of is closed position to its open position serves to release neck H2 for un-restraining or otherwise releasing head H1 of horse H. Outer side 92A of lower panel below semi-circular lower collar segment 200 of head restraint 196 is exteriorly padded by attached padding 209.

A standard back-door latch 130 in FIGS. 2 and 6 works between back door 92 and back wall 86 of housing 30 in FIGS. 2 and 6 for securing back door 92 in its closed position and releasing back door 92 from its closed position for enabling back door 92 to be selectively opened and closed, i.e. out of its open position in FIG. 6 to into its closed position in FIG. 2, and out of its closed position in FIG. 2 to into its open position in FIG. 6. Latch 130 is a standard lever-type latch including a handle 132 hinged by a pivot 134 to a lug 136 hinged by a standard hinge 138 to back wall 86 proximate to exitway 93, and catch 140 attached to outer side 92A of lower panel 190 of back door 92 adjacent to outer edge 92D in this example. When back door 92 is closed in FIG. 2, a user need only take up handle 132 by hand and turn lug 136 inwardly in the direction of arrow D to urge it against outer side 92A of back door 92 proximate to its outer edge 92D, and then turn handle 132 downwardly in the direction of arrow E into catch 140 outwardly extending from outer side 92A of back door 92 to secure latch 130 and thus back door 92 in its closed position. Reversing this operation serves to release latch 130 for releasing back door 92 from its closed position for enabling it to be opened in FIG. 6. Those having ordinary skill in the art will readily appreciate that any form of latch configured to positive lock for back door 92 closed, basically consisting of a plunger or bar falling or sliding onto or into a corresponding catch, groove, hole, etc., can be used with back door 92.

Referring to FIGS. 2 and 15, a flexible line 144, such as a rope or cord, has an inner end 144A attached to upper panel 194 by a standard bracket 146 affixed to upper panel 194 proximate to its upper edge, and an opposed outer end 144B. Line 144 extends upwardly from inner end 144A to and over a standard pulley 148 affixed to back wall 86 proximate to top 72, and outwardly from pulley 148 to outer end 144B. When desired, upper panel 194 may be raised to its open position in FIG. 15 from its lowered position in FIG. 2 simply by forcibly pulling line 144 from its outer end 144B downwardly, such as by a trainer standing on the ground facing back wall 86. When line 144 is so pulled, line 144 is drawn outwardly over pulley 148 to open upper panel 194, forced by the tensioned line 144 pulling on upper panel 194 between pulley 148 to inner end 144A of line 144 connected to front door 90. To lower upper panel 194 from its raised position in FIG. 15 to its lowered position in FIG. 2, this operation need only be reversed or outer end 144B of line 144 released enabling upper panel 194 to simply fall by gravity from its raised position in FIG. 15 to its lowered position in FIG. 2. Upper panel 194 can otherwise be moved between its lowered and raised positions by hand.

Figure 20:
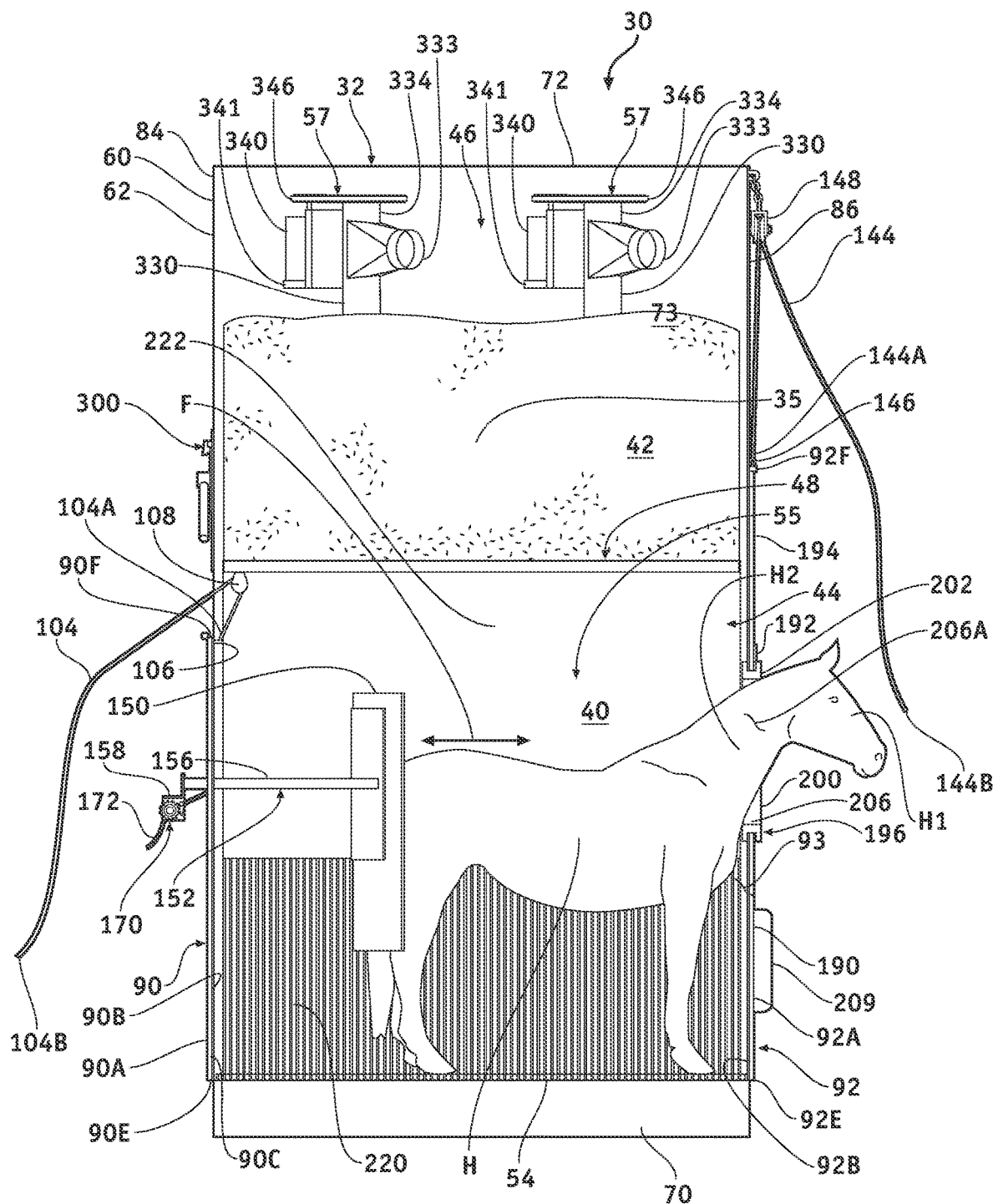
FIG. 20 is a view corresponding to FIGS. 18 and 19 illustrating the horse as it would appear goaded forwardly in the direction of the back door by the goading fixture adjusted to its extended position urging the horse's head outwardly from the stall through the head restraint now closed around the horse's neck thereby securing its head.

Referring to FIGS. 1, 2, 17, 18, and 20, apparatus 50 is configured with a goading fixture 130 useful for goading a horse toward back door 92 from behind when it is standing and confined in stall 44 between its sides and its ends toward back door 92 in FIG. 20 when both front door 90 and back door 92 are shut as shown in FIG. 20. Front door 90 is configured with goading fixture 130, which is within stall 44 when front door is closed in FIGS. 1, 17, 18, and 20, and withdrawn from stall 44 through entryway 91 when front door 90 is open in FIGS. 4, 14, and 16. Goading fixture 130 is mounted to front door 90 for movement in reciprocal directions relative to inner side 90B of front door 90 and through stall 44 when front door 90 is closed in FIGS. 18 and 19 in the directions of double arrow F between a retracted position in FIG. 18 toward entryway 91 and inner side 90B of front door 90 and away from exitway 93 and inner side 92B back door 92, and an extended position in FIG. 20 away from entryway 91 and inner side 90B of front door 90 and toward exitway 93 and inner side 92B of back door 92.

Goading fixture 130, a broad, rigid cradle or concave carried by a rigid frame 152 configured with a push bar/member 158 used to suitably push and pull frame 152 by hand. Frame 152 extends across front door 90 from outer side 90A to inner side 90B, supports push bar 158 on outer side 90A of front door 90, and supports goading fixture 130 on inner side 90B of front door 90. Frame 152 is mounted to front door 90 for reciprocal movement in the directions of double arrow F between a first or retracted position in FIG. 18 and a second or extended position in FIG. 20. Goading fixture 130 occupies its retracted position when frame 152 occupies its first or retracted position in FIG. 18. Goading fixture 130 occupies its extended position when frame 152 occupies its second or position in FIG. 20. Reciprocal movement of frame 152 in the directions of double arrow F in FIGS. 1, 4, 18 and 19 between its first/retracted position and its second/extended position imparts corresponding reciprocal movement of goading fixture 130 in the directions indicated by double arrow F between its retracted position in FIG. 18 and its extended position in FIG. 20. Push bar 158 is useful for pushing and pulling frame 158 by hand for reciprocating it between its retracted and extended positions and, by extension, goading fixture 130 between its retracted and extended positions.

Referring to FIGS. 1 and 4, frame 120 includes opposed, parallel, coextensive, and rigid elongate members 154 and 156, which extend across front door 90 through respective openings 160 and 162 through front door 90 from the attached, horizontal push bar 158 on outer side 90B of front door 90 to the attached goading fixture 130 on inner 90C side of front door 90. Members 154 and 156 are free to slide reciprocally through the respective openings 160 and 162 for enabling frame 152 to reciprocate between its retracted and extended positions.

Figure 5:
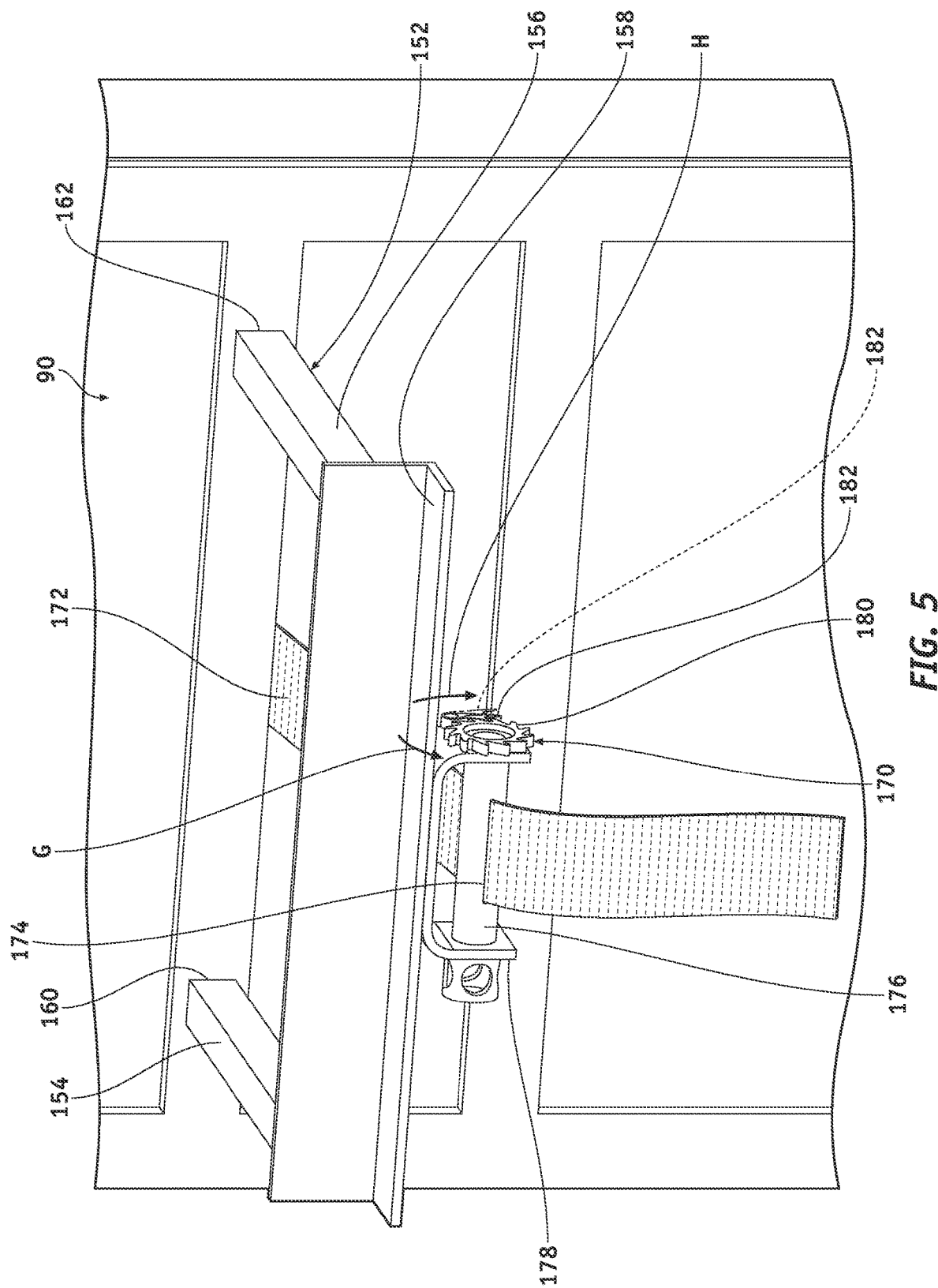
FIG. 5 is an enlarged, fragmentary perspective corresponding to FIG. 4 illustrating the ratchet strap assembly coupled between the frame and the front door.

Coupled between frame 162 and front door 90 in FIGS. 1, 2, and 5, is a ratchet strap assembly 170. Ratchet strap assembly 170 is adjustable between a released position and an engaged position. Frame 152 is enabled to move freely between its retracted and extended positions for enabling movement of goading fixture 130 between its retracted and extended positions, when ratchet strap assembly 170 is in its released position. Frame 152 is disabled from moving in the direction of its retracted position thereby disabling goading fixture 130 from moving in the direction of its retracted position without disabling frame 152 from moving in the direction of its extended position and thereby without disabling goading fixture 130 from moving in the direction of its extended position, when ratchet strap assembly 170 is in its engaged position.

Referring to FIG. 5, ratchet strap assembly 170 includes a flexible strap or webbing 172 of leather, tough woven fibers of cotton, polyester, and/or nylon, and is affixed centrally to front door 90. Strap 172 extends outwardly from outer side 90A of door 90 through a slot 174 through a rigid spool 176 mounted rotatably to a bracket 178 affixed to push bar 158 at an intermediate location between member 154 and 156. Spool has a rigidly-attached pinion 180. A pawl 182 attached to bracket 178 interacts with pinion 180 preventing spool 176 from rotating in the direction of arrow G without disabling spool 176 from rotating in the opposite direction of arrow H. After the slack is pulled out of strap 172 between outer side 90A of front door 90 and spool 178, rotation of spool 176, such as with the use of a crowbar or other leveraging tool, in the direction of arrow H opposite to the direction of arrow G wraps strap 172 around spool 176 and tensions and shortens it between outer side 90A of front door 90 and spool 176 concurrently urging frame 152 and the attached goading fixture 130 in the direction of their extended positions. At the same time, the interaction of pawl 182 with pinion 180 disables spool 176 from rotating in the direction of arrow G preventing strap 172 from unwinding from spool 176 and disabling frame 152 and the attached goading fixture 130 from moving in the direction of their retracted positions by the tensioned and secured strap 172 between outer side 90A of front door 90 and spool 178 about which strap 172 is wound. As with a typical ratchet assembly, pawl 182 is hinged to bracket 182 with a pivot pin 184 enabling pawl 182 to turn between its working position interacting with pinion 180 and its non-working position free of pinion 180 for allowing spool 176 to rotate freely in the direction of arrow G for allowing frame 152 and goading fixture 130 to be moved in the direction of their retracted positions and, moreover, from their extended positions to their retracted positions. Other suitable ratchet or adjustment assemblies can be used in alternate embodiments for enabling movement of frame 152 between its retracted and extended positions when in a released position and disabling movement of frame 152 in the direction of its retracted position and away from its extended position when in a secured position in alternate embodiments.

As described above, and with particular reference to FIGS. 7, 8, and 23, stall 44 includes a horizontal floor 54 and opposed, parallel side walls 55 and 56 projecting upright from either side of floor 54 to hoppers 50 and 52, respectively, upright side wall 55 defines one side of stall 44 parallel to side wall 80 of housing 32, upright side wall 56 defines the opposite side of stall 44 parallel to side wall 82 of housing 32, and stall 44 defined by its floor 54, which is flat, and side walls 55 and 56, which are also flat and extend longitudinally through lower section 40 of housing 32 from entryway 91 at the entry end of stall 44 at front wall 84 to exitway 93 at the exit end of stall 44 at back wall 86. Floor 54 is a flat grate of metal, a framework of crossed bars defining holes or openings for material 35 to pass therethrough into bottom 70, and is supported on either side atop elevated, opposed, parallel, elongate supports/rails 210 and 212 affixed to base 70 extending longitudinally between front wall 84 and back wall 86. Side walls are 55 and 56 are supported atop and project upright from rails 210 and 212, respectively, on either side of grate 54.

Side walls 55 and 56 are identical, each consisting of a flat grate 220 of metal, a framework of upright, parallel bars defining upright slots or openings for material 35 to pass therethrough, and a flat dividing wall 222 of metal, plastic, or wood, which is solid and without openings therethrough for preventing material 35 from passing therethrough. For clarity, reference characters 220 and 222 denoting the grate and dividing wall, respectively, of side wall 56 include prime "'" symbols. Grate 220 project upright from rail 210 to dividing wall 222, and dividing wall 222 projects upright from grate 220 to bottom 48 of tank 46 below and adjacent to hopper 50. Grate 220' project upright from rail 212 to dividing wall 222', and dividing wall 222' projects upright from grate 220' to bottom 48 of tank 46 below and adjacent to hopper 52. Grates 220 and 220' and dividing walls 222 and 222' are substantially coextensive. Grates 220 and 220' are open to the respective collection chambers 58 and 59 by their defined openings for material 35 to pass therethrough from stall 44 to collection chambers 58 and 59.

Figure 7:
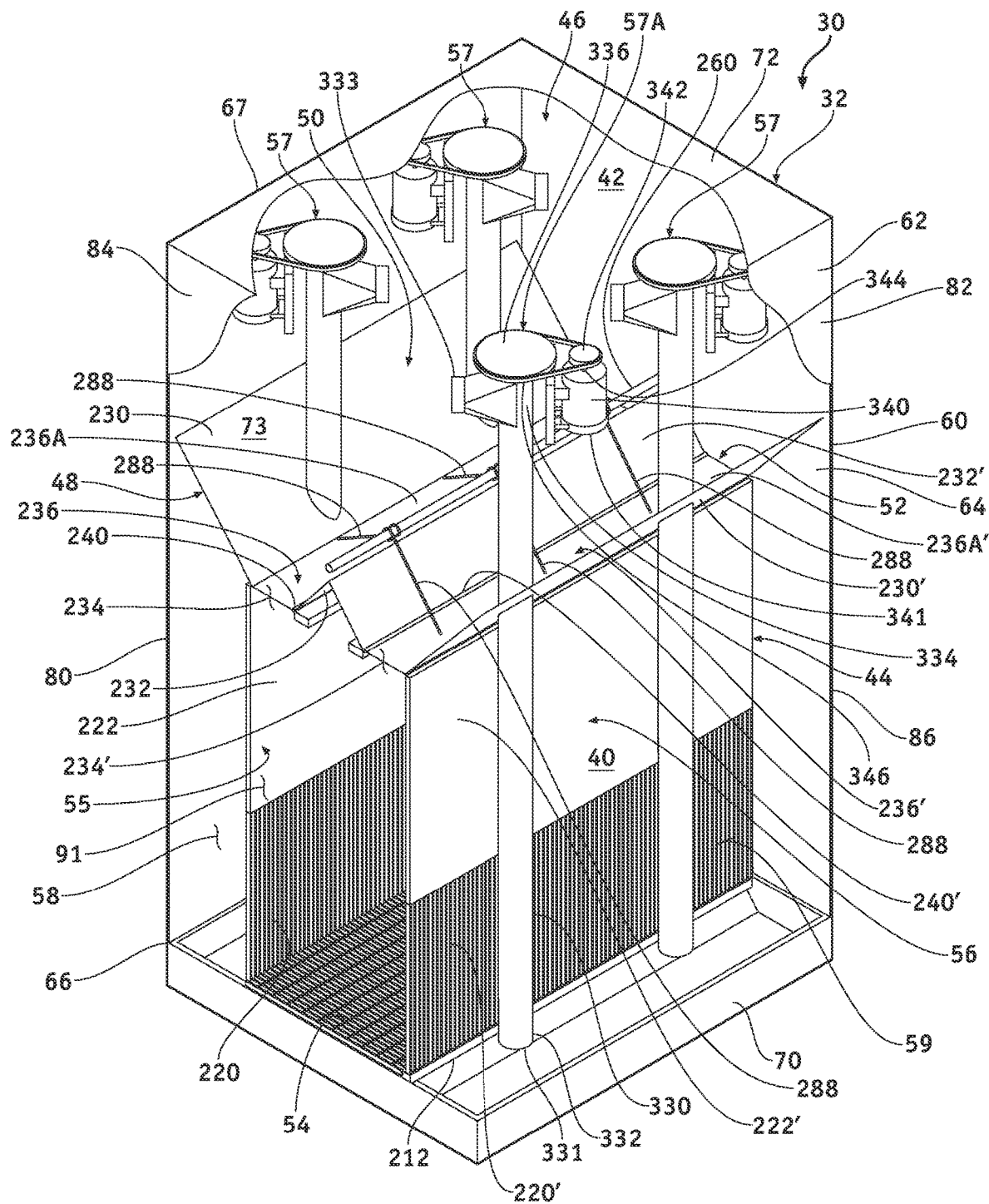
FIGS. 7 and 8 are perspective views of the embodiment of FIGS. 1 and 2 with portions of the housing broken away illustrating a lower section under an upper section and elevators all within the housing, the lower section configured with the stall, the upper section including a tank for loose granular material over the stall and configured with a hopper proximate to each side of the stall, the hoppers concurrently openable for releasing the loose granular material into the lower section from above the stall along the respective sides thereof for sufficiently filling the stall with the loose granular material for covering at least a portion of a horse confined in the stall, the elevators for re-circulating the loose granular material from the lower section to the tank, and additionally illustrating an adjustment member mounted to the housing for displacement between a hold position and a release position and mechanically coupled to the hoppers, whereby displacement of the adjustment member from the hold position to the release position concurrently opens the hoppers, and displacement of the adjustment member from the release position to the hold position concurrently closes the hoppers.
Figure 8:
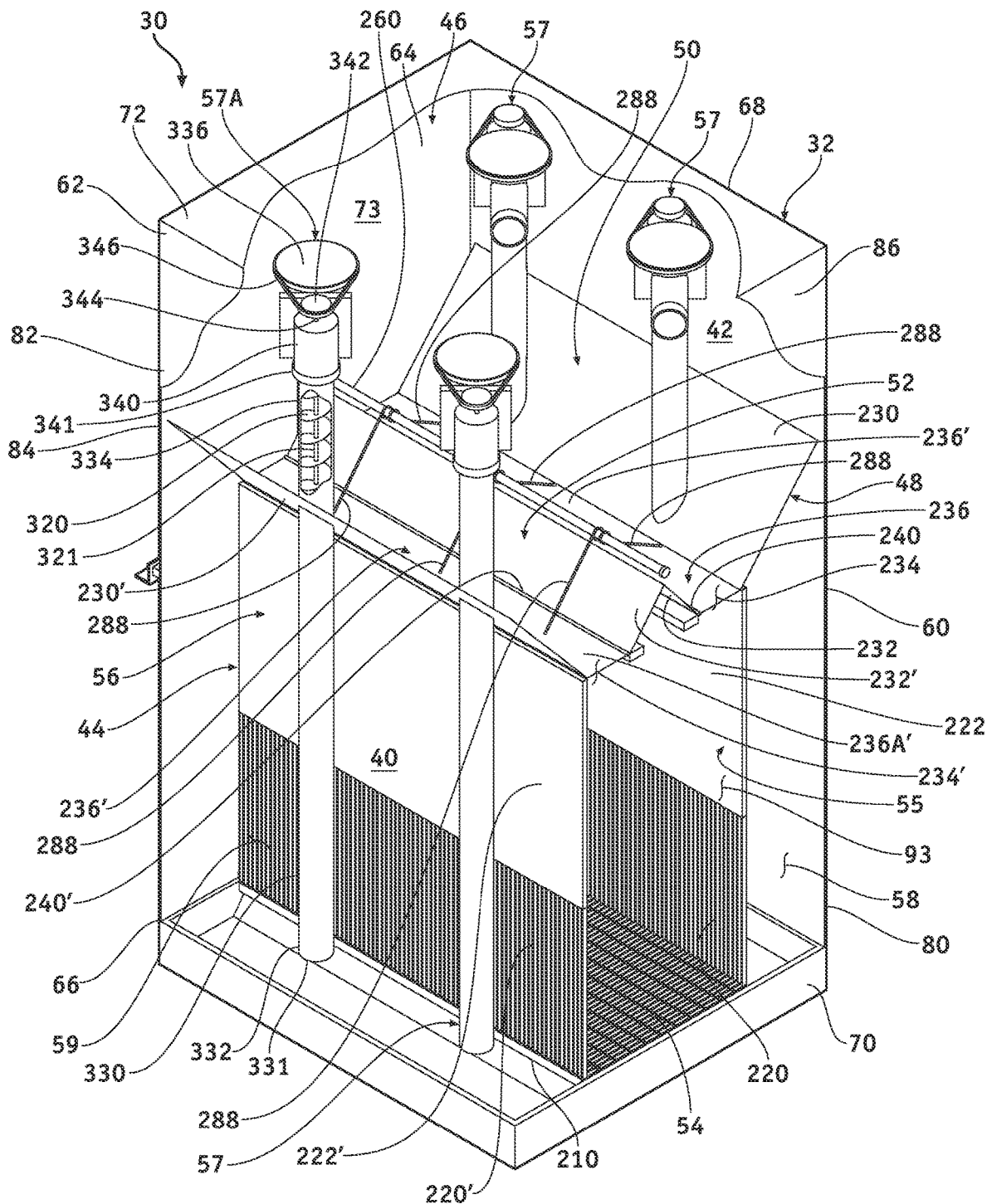
Figure 9:
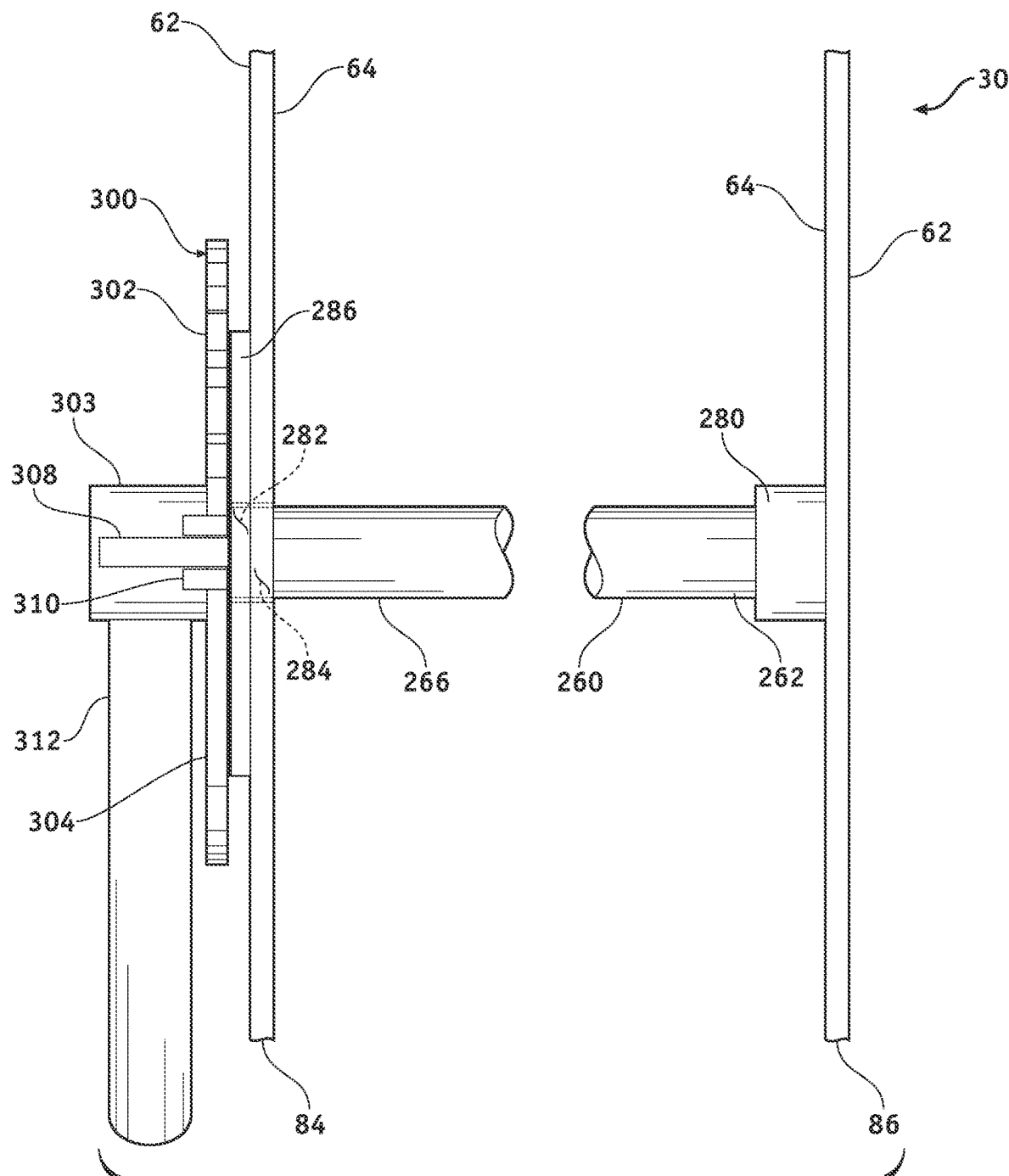
FIG. 9 is an enlarged, fragmentary top plan view of the adjustment member of FIG. 8 mounted to the housing and an adjustment member latch coupled between the housing and adjustment member for securing the adjustment member in the hold position and releasing the adjustment member from the hold position.
Figure 10:
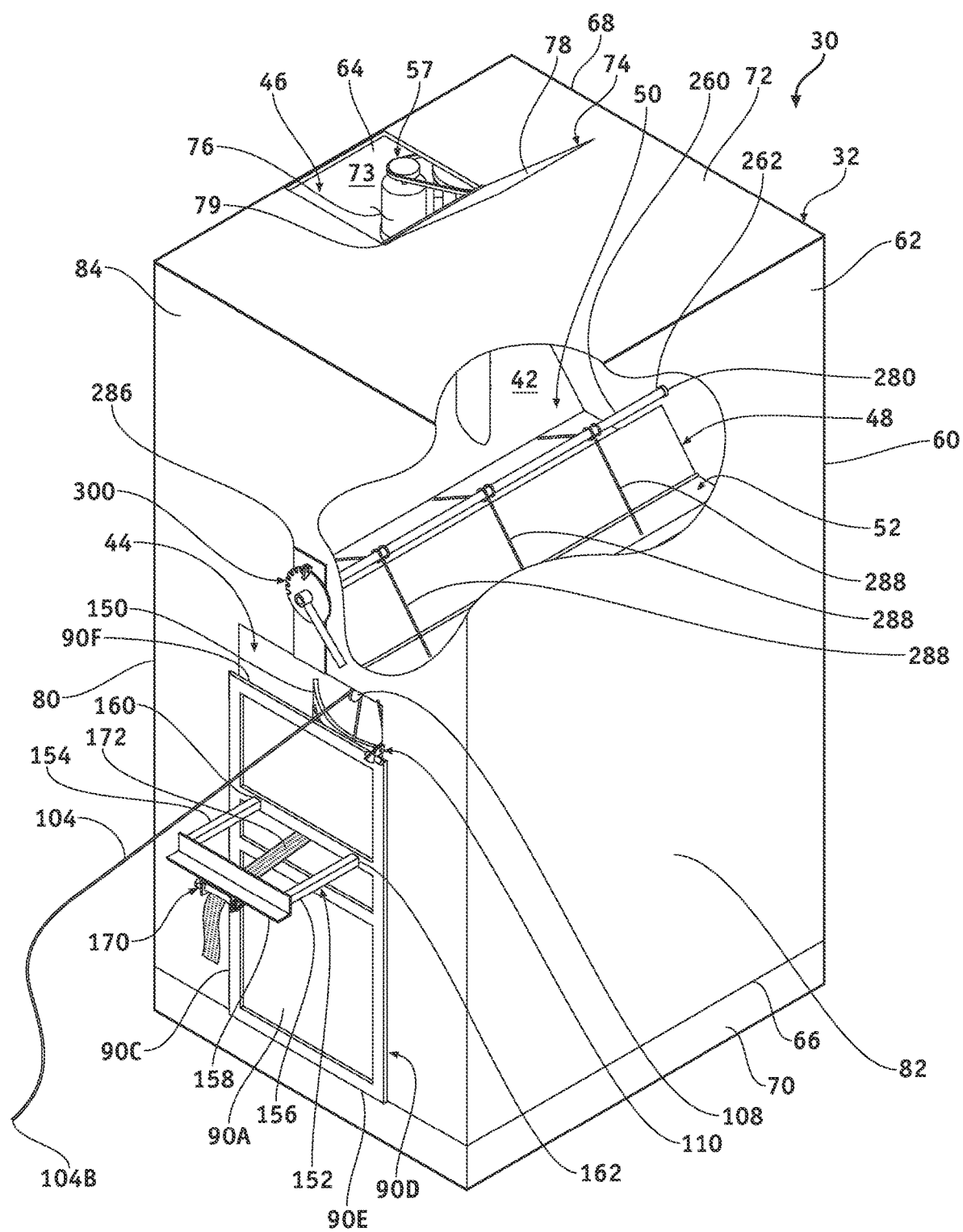
FIG. 10 is a perspective view of the embodiment of FIG. 1 with portions of the housing broken away for illustrative purposes.

Referring to FIGS. 7 and 8, hoppers 50 and 52 are parallel relative to side walls 80 and 82 and perpendicular relative to front and back walls 84 and 86. Hopper 50 includes opposed hopper walls 230 and 232 that incline downwardly to gravity feed loose granular material in tank 46 to dispensing opening 234 through bottom 48. Dispensing opening 234 is defined between the longitudinally extending and angularly converging hopper walls 230 and 232 and is configured with a closure, denoted generally at 236, mounted to hopper wall 232 of bottom 48 for movement between a closed position closing dispensing opening 234 for disabling material 35 from passing downwardly therethrough from tank 46 into lower section 40 and an open position in FIG. 23 for enabling material 35 to pass downwardly therethrough from tank 46 into lower section 40. Accordingly, opening 234 is closed when closure 236 is in its closed position, and is open when closure 236 is in its open position. Hopper walls 230 and 232, dispensing opening 234, and closure 236 that define hopper 50 extend longitudinally from front wall 80 to back wall 82.

Closure 236 is a panel or door 236A in a preferred embodiment, which spans dispensing opening 234 and is exemplary of a solid, movable barrier used to open and close dispensing opening 244, in this example turning or otherwise pivoting on a standard hinge 240, although separate hinges could be used in alternate embodiments, in the opening and closing of door 236A. Hinge 240 hingedly connects door 236A to hopper wall 232 of bottom 48. Door 236A turns/pivots on hinge 240 in the directions indicated by double-arrow J in FIGS. 22 and 23 between its closed position in FIG. 22 toward dispensing opening 234 raised away from stall 44 in lower section 40, in which dispensing opening 234 is closed, and its open position in FIG. 23 lowered away from dispensing opening 234 toward and into stall 44 in lower section 40, in which dispensing opening 234 is open. Dispensing opening 234 and door 236A are directly over stall 44 adjacent to and inboard of dividing wall 222 of side wall 55 of stall 44, and door 236A turns out of its closed position to its open position outwardly toward the inner side of dividing wall 222 of side wall 55 facing into stall 44 for directing material 35 falling through dispensing opening 234 toward the inner side of dividing wall 222 facing into stall 44.

Hopper 52 is the mirror image of hopper 50 and includes opposed hopper walls 230' and 232' that incline downwardly to gravity feed loose granular material in tank 46 to dispensing opening 234' through bottom 48. Dispensing opening 234' is defined between the longitudinally extending and angularly converging hopper walls 230' and 232' and is configured with closure 236' mounted to hopper wall 232' of bottom 48 for movement between a closed position closing dispensing opening 234' for disabling material 35 from passing downwardly therethrough from tank 46 into lower section 40 and an open position in FIG. 23 for enabling material 35 to pass downwardly therethrough from tank 46 into lower section 40. Hopper walls 230' and 232', dispensing opening 234', and closure 236' that define hopper 52 extend longitudinally from front wall 80 to back wall 82.

Closure 236', door 236A', spans dispensing opening 234' and is a solid, movable barrier used to open and close dispensing opening 234', in this example turning or otherwise pivoting on hinge 240' in the opening and closing of door 236A'. Hinge 240' hingedly connects door 236A' to hopper wall 232' of bottom 48. Door 236A' turns/pivots on hinge 240' in the directions indicated by double-arrow J' in FIGS. 22 and 23 between its closed position in FIG. 22 toward dispensing opening 234' raised away from stall 44 in lower section 40, in which dispensing opening 234' is closed, and its open position in FIG. 23 lowered away from dispensing opening 234' toward and into stall 44 in lower section 40, in which dispensing opening 234' is open. Dispensing opening 234' and door 236A' are directly over stall 44 adjacent to and inboard of dividing wall 222' of side wall 56 of stall 44, and door 236A turns out of its closed position to its open position outwardly toward the inner side of dividing wall 222' of side wall 55 facing into stall 44 for directing material 35 falling through dispensing opening 234' toward the inner side of dividing wall 222' facing into stall 44.

Hopper 50 is proximate to and above side wall 55, one side of stall 44, and hopper 52 is proximate to and above the opposite side wall 56, which is the opposite or opposed side of stall 44. Hoppers 50 and 52 are openable directly above stall 44 at either side thereof in FIG. 23 by opening doors 236A and 236A' from being closed in FIG. 22 for rapidly releasing material 35 from tank 46 along the lengths of the respective sides 55 and 56 of stall 44 extending between the opposed ends of stall 44 directly into stall 44 for rapidly, within about 5-10 seconds in this example, filling stall 44 with material 35 in an amount sufficient to cover and thereby immobilize at least a portion of horse H in FIGS. 24, 25, and 26 within the material 35, while preventing material 35 from falling directly onto the back of horse H standing in stall 44 between its opposed sides defined by side wall 55 and 56 in FIG. 23 to prevent horse H from being unnecessarily startled. When material 35 is released into stall 44 from dispensing openings 234 and 234', the outwardly opened doors 236A and 236A' direct the flow of material 35 outwardly against the inner sides of the respective dividing walls 222 and 222', which confine the material 35 falling into stall 44 along the inner sides of the respective dividing walls 222 and 222' until it reaches grates 220 and 220'. The material 35 falling downwardly along grates 220 and 220' sufficiently fills stall 44 with material 35 for covering and thereby immobilizing at least a portion of a horse H standing and confined in stall 44 in FIGS. 24, 25, and 26 within the material 35. At the same time, the excess material 35 flows by gravity outwardly from stall 44 through the respective grates 220 and 220' and into the respective collection chambers 58 and 59 partially filling them in FIG. 24. The material 35 also flows through the grate floor 54 into base 70 of housing 32 open to the respective collection chambers 58 and 59. This characterizes how lower section 40 is filled with the material 35 released therein from tank 46.

Hoppers 50 and 52 are opened and closed by opening and closing doors 236A and 236A' with the use of an adjustment member 260 in FIGS. 7, 8, 10, 22, and 23. Adjustment member 260 is manually operable and mounted to housing 32 for movement between a hold position in FIGS. 7, 8, and 22, and a release position in FIG. 23. Adjustment member 260 is mechanically coupled to hoppers 50 and 52, wherein hoppers 50 and 52 are concurrently closed and disabled from opening when adjustment member 260 is in its hold position, and are enabled to concurrently open when adjustment member 260 is moved out of its hold position and into its release position. More specifically, adjustment member 260 is mechanically coupled to doors 236A and 236A', wherein doors 236A and 236A' are concurrently closed and disabled from opening when adjustment member 260 is in its hold position, and are enabled to concurrently open when adjustment member 260 is moved out of its hold position and into its release position.

In a preferred embodiment, adjustment member 260 is an elongate rod or bar mounted for rotation to housing 32 between its hold and release positions. Adjustment member 260 has opposed ends 262 and 264. Adjustment member 260 extends longitudinally through tank 46 in FIGS. 7, 8, and 10 between hoppers 50 and 52 at an intermediate position between side walls 80 and 82 from end 262 journaled to a fitting 280 affixed to inner surface 64 back wall 86 to end 264, which extends outwardly through an opening 282 extending through front wall 84 from inner surface 64 to outer surface 62 and an axially-aligned opening 284 through a reinforcement plate 286 affixed to outer surface 62 of front wall 84 to a latch 300. Adjustment member 260 is free to rotate in openings 282 and 284. Latch 300 is configured to secure adjustment member 260 in its hold position, in which hoppers 50 and 52 are concurrently secured in their closed positions and concurrently disabled from moving out of their closed positions to their open positions, and release adjustment member 260 from its hold position, in which hoppers 50 and 52 are concurrently released from their closed positions and concurrently enabled to move out of their closed positions to their open positions. More specifically, latch 300 is configured to secure adjustment member 260 in its hold position, in which doors 236A and 236A' are concurrently secured in their closed positions and concurrently disabled from moving out of their closed positions to their open positions, and release adjustment member 260 from its hold position, in which doors 236A and 236A' are concurrently released from their closed positions and concurrently enabled to move out of their closed positions to their open positions.

Adjustment member 260 is mechanically coupled to doors 236A and 236A' with identical couplings 288 in tank 46, including three longitudinally spaced-apart couplings 288 mechanically coupled between adjustment member 260 and door 236A, and three longitudinally spaced-apart couplings 288 mechanically coupled between adjustment member 260 and door 236A'. Each coupling 288 is an elongate, flexible, chain of metal, although a belt of leather, rubber, or woven fibers of cotton, polyester, or nylon are useful alternate embodiments. Each coupling 288 coupled between adjustment member 260 and door 236A includes an end affixed to adjustment member 260 and an opposed end affixed to door 236A. Identically, each coupling 288 coupled by welding or fasteners between adjustment member 260 and door 236A' includes an end affixed to adjustment member 260 and an opposed end affixed to door 236A'. Couplings 288 concurrently wind and unwind relative to adjustment member 260 in response to rotation of adjustment member 260 between its hold and release positions for concurrently facilitating adjustment of doors 236A and 236A' between their closed and open positions. When adjustment member 260 is in its hold position in FIGS. 19 and 22, couplings 288 are wound partially around adjustment member 260, in which the shortened lengths of couplings 288 between adjustment member 260 and the respective doors 236A and 236A' serves to hold the respective doors 236A and 236A' shut/closed. When adjustment member 260 rotates out of its hold position in FIGS. 19 and 22 to its release position in FIGS. 23 and 26, couplings 288 concurrently unwind from adjustment member 260 and inherently concurrently lengthen between adjustment member 260 and the respective doors 236A and 236A' thereby concurrently releasing doors 236A and 236A from their closed positions and enabling them to concurrently turn out of their closed positions in FIGS. 19 and 22 to their open positions in FIGS. 23 and 26 under the inherent weight of the material 35 in tank 46 concurrently weighing against doors 236A and 236A'. The lengths of couplings 288 between adjustment member 260 and the respective doors 236A and 236A' in the release position of adjustment member 260 serves to hold the respective doors 236A and 236A' open when adjustment member 260 is in its release position. This operation need only be reversed to concurrently adjust doors 236A and 236A' back to their closed positions in FIGS. 19 and 20 from their open positions in FIGS. 23 and 26. While there are three longitudinally spaced-apart couplings 288 mechanically coupled between adjustment member 260 and door 236A and three longitudinally spaced-apart couplings 288 mechanically coupled between adjustment member 260 and door 236A', less or more can be used between adjustment member 260 and each of doors 236A and 236A', if desired, including just one coupling 288 if so desired.

Figure 11:
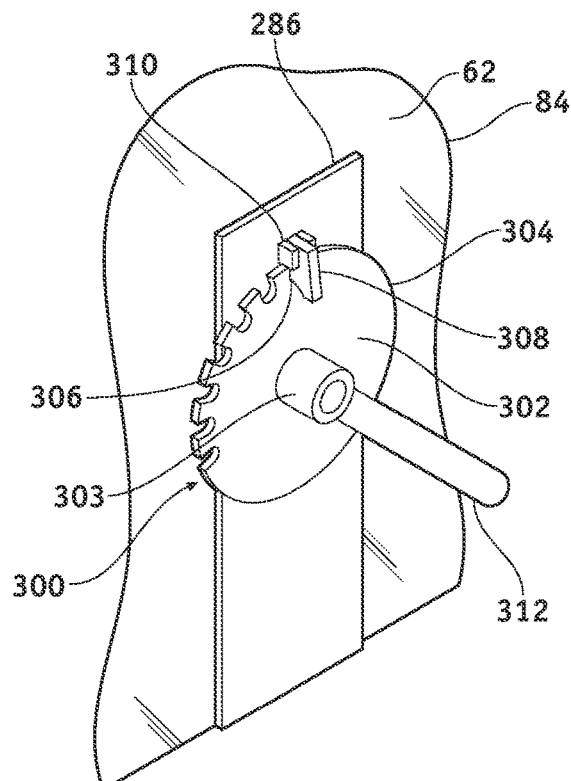
FIG. 11 is a fragmentary perspective view corresponding to FIG. 9 illustrating the adjustment member latch as it would appear secured for securing the adjustment member in its hold position.
Figure 12:
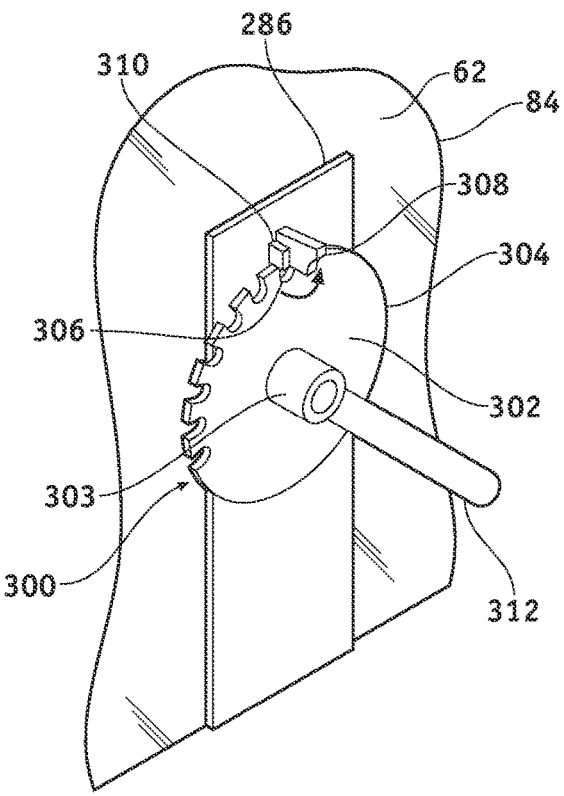
FIG. 12 is a view corresponding to FIG. 11 illustrating the adjustment member latch as it would appear released for releasing the adjustment member from its hold position.
Figure 13:
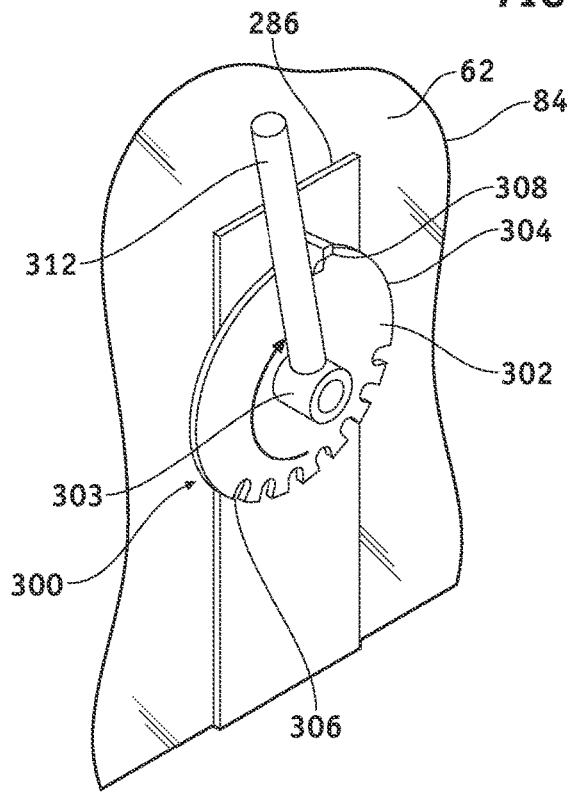
FIG. 13 is a view corresponding to FIG. 12 illustrating the adjustment member latch as it would appear released when the adjustment member is in its released position.

Latch 300 works between front wall 84 of housing 32 and adjustment member for securing adjustment member 260 in its hold position, in which doors 236A and 236A' of the respective hoppers 50 and 52 are secured in their closed positions, and releasing adjustment member 260 from its hold position, in which doors 236A and 236A' of the respective hoppers 50 and 52 are released from their closed positions and enabled to move to their open positions for releasing material 35 into lower section 40 from tank 46 while adjustment member 260 rotates from its hold position to its release position. Referring to FIG. 11, latch 300 includes a disk 302 extending radially outward from a hub 303 affixed to end 264 of adjustment member 260 to a perimeter edge 304, a catch in the form of a notch 306 formed in perimeter edge 304, a plunger 308 hinged to a bracket 310 affixed to reinforcement plate 286 for pivotal movement between a lowered position in FIG. 11 and a raised position in FIGS. 12 and 13 adjacent to perimeter edge 304, and a handle 312 affixed to and extending radially outward from hub 303. FIG. 11 illustrates disk 302 as it would appear in the hold position of adjustment member 260, notch 306, one of a series of identical notches formed in perimeter edge 304, registered with plunger 308, and latch 300 secured by plunger 308 hinged to its lowered position received by notch 306 securing disk 302 thereby securing adjustment member 260 in its hold position and the respective doors 236A and 236A' in their closed positions. Pivoting plunger 308 upwardly out of its lowered position in notch 306 in FIG. 11 to its raised position in FIG. 12 withdrawn from notch 306 releases latch 300 by releasing plunger 308 from disk 302 thereby releasing adjustment member 260 from its hold position enabling it to rotate to its release position in FIG. 23 from its hold position in FIG. 22 for concurrently enabling doors 236A and 236A' to turn into their open positions in FIG. 23 from their closed positions in FIG. 22. When adjustment member 260 rotates to its release position in FIG. 23 from its hold position in FIG. 22, disk 392 and the attached handle 312 concurrently rotate until handle 312 strikes plunger 308 while in its raised position in FIG. 13 thereby arresting adjustment member 260 from rotating beyond its release position for securing doors 236A and 236A' in their open positions. Reversing this operation serves to rotate adjustment member 260 and disk 302 and its appurtenances back to the hold position of adjustment member 260 in FIG. 22 from its released position in FIG. 23, which concurrently turns doors 236A and 236A' from their open positions in FIG. 23 to their closed positions in FIG. 27 by the lengths of the couplings 288 concurrently shortening between adjustment member 260 and doors 236A and 236A', and secures latch 300 in FIG. 11 to secure adjustment member 260 in its hold position thereby concurrently securing doors 236A and 236A' in their closed positions. Plunger 308 can be moved between its raised and lowered positions by a pole or the like held by a trainer standing on the ground in front of front wall 84, or by hand by the trainer standing on a ladder enabling the trainer to reach plunger 308.

Figure 28:
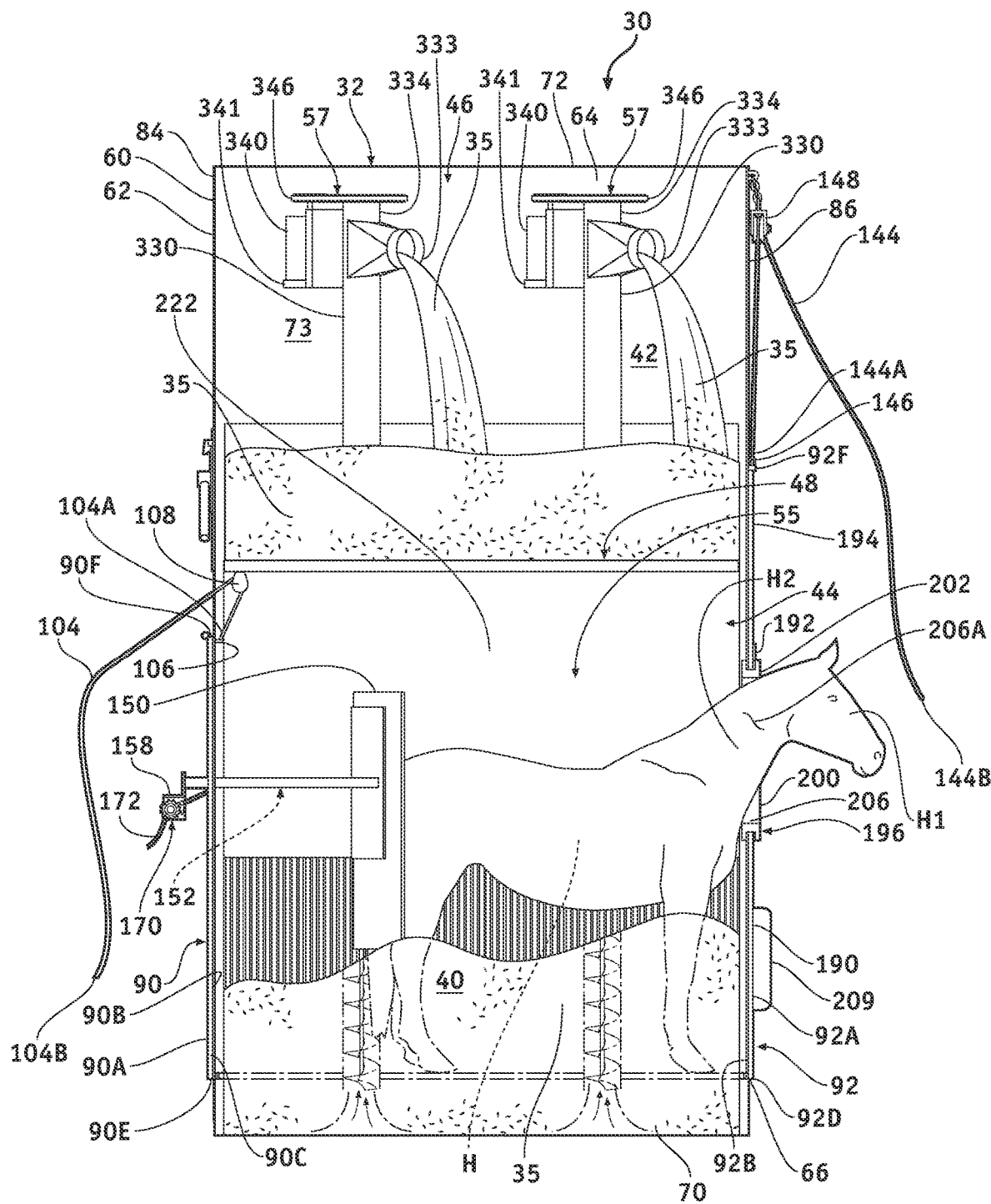
FIG. 28 is a view similar to FIG. 27 illustrating the elevators first illustrated in FIGS. 7 and 8 as activated re-circulating the loose granular material from the lower section to the tank.
Figure 29:
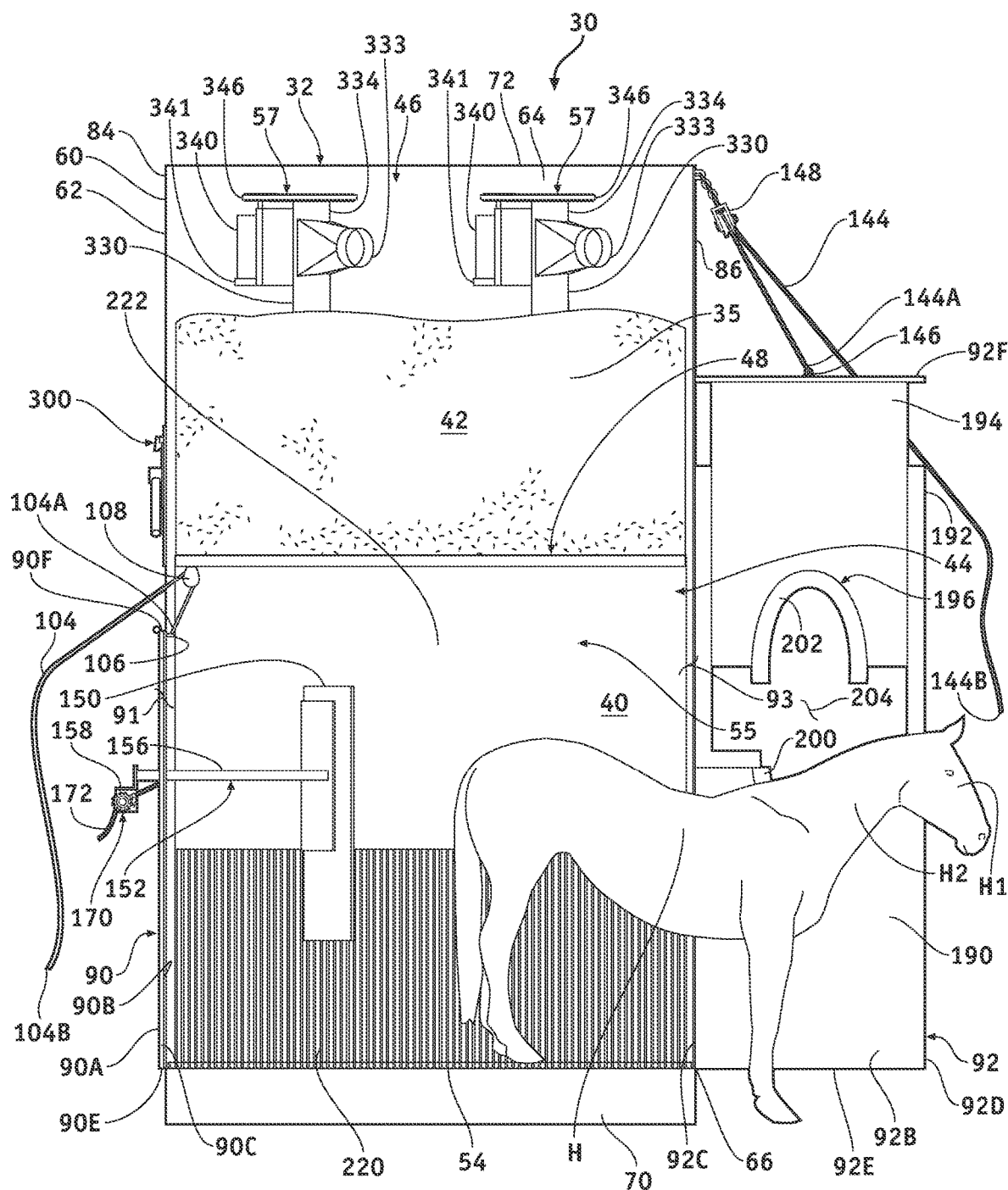
FIG. 29 is a view corresponding to FIG. 20 and further illustrating the back door opening the exitway from the stall, and the horse as it would appear exiting the stall through the open exitway.

As explained above, and with particular reference to FIGS. 7 and 8, elevators 57 in volume 73 are operatively coupled between collection chambers 58 and 59 of lower section 40 and tank 46 of upper section 53 so that when activated serve to withdraw material 35 from lower section 40, including stall 44, from collection chambers 48 and 59 and elevate it back to tank 46 in FIG. 28 for replenishing tank 46 with material 35 for reuse and freeing the horse standing in stall 44 from material 35. Elevators 57 are, therefore, configured to recirculate material 35 from lower section 40, including stall 44, to tank 46. As elevators 57 work to elevate material 35 from collection chambers 58 and 59 to tank 46, material 35 in stall 44 steadily drains by gravity outwardly from stall 44 into collection chambers 58 and 59 through grates 220 and 220' and floor 54 until stall 54 and collection chambers 58 and 59 are substantially emptied of material 35 having been elevated to tank 46 for reuse. Elevators 57 are identical. Accordingly, one elevator 57A will now be discussed, with the understanding that the ensuing discussion of elevator 57A applies in every respect to each elevator 57.

Referring in relevant part to FIGS. 7 and 8, elevator 57A includes an elongate auger 320 housed in an auger conduit 330. Auger conduit 330 extends upright through collection chamber 59 on the outer side of side wall 56 from an inlet 331 at a lower end 332 proximate to base 70 and through hopper wall 230' to an outlet 333 at an upper end 334 of auger conduit 330 in tank 46. Auger 320 extends upright through auger conduit 330 from adjacent to inlet 331 at lower end 332 to adjacent to outlet 333 at upper end 334, and is arranged about an auger shaft 321 that extends outwardly from upper 334 to an attached driven gear 336. A bracket or harness assembly 341 connected to auger conduit 330 proximate to upper end 334 supports a standard electric motor 340 operatively coupled to a drive gear 332 by a drive shaft 344, which rotates drive gear 332 upon activation of motor 340. Drive gear 332 is operatively coupled to driven gear 336, whereby rotation of drive gear 332 upon activation of motor 340 imparts corresponding rotation to driven gear 336 thereby imparting rotation to auger 430 within auger conduit 330. In response to rotation of auger 320 within auger conduit 330, auger 320 intakes material 35 into auger conduit 330 at collection chamber 59 through inlet 331, elevates the material 35 through auger conduit 330 from inlet 321 to upper end 334, and ejects the material 35 outwardly into tank 46 through outlet 333, which is a spout. In example, drive gear 332 is operatively coupled to driven gear 336 by a tensioned endless belt 346 entrained about drive and driven gears 332 and 336. Motor 340 is electrically wired to a power source 350 in FIG. 1 through a junction box 352 mounted to outer surface 64 of side wall 80 of housing 32 just above base 70. Junction box 352 is configured with a standard toggle switch 354 movable between an OFF position, in which motor 340 is deactivated, and an ON position indicated by the dotted line position of switch 354, in which motor 340 is activated. In this example, power source 350 is a standard generator electrically wired to junction box 352. Instead of a generator, power source 350 can be a battery power source or a dedicated power source, in alternate embodiments.

In the present example, there are four elevators, two elevators 57 on the outer side of side wall 55 and operatively coupled between collection chamber 58 and tank 46 and which each extend upright through collection chamber 58 on the outer side of side wall 55 from inlet 331 at a lower end 332 proximate to base 70 and through hopper wall 230' of bottom 48 to outlet 333 and motor 340 at upper end 334 of auger conduit 330 in tank 46, and two elevators 57 on the outer side of side wall 56 and operatively coupled between collection chamber 59 and tank 46 and which each extend upright through collection chamber 59 on the outer side of side wall 56 from inlet 331 at a lower end 332 proximate to base 70 and through hopper wall 230' of bottom 48 to outlet 333 and motor at upper end 334 of auger conduit 330 in tank 46. In response movement of switch 354 to its ON position, the motors 340 of the respective elevators 57 each electrically wired to power source 350 through junction box 352 concurrently activate, resulting in elevators 57 concurrently working to elevate material 35 from collection chambers 58 and 59 to tank 46. Upon draining lower section 40 of material 35, motors 340 concurrently deactivate thereby concurrently deactivating elevators 57 in response to movement of switch 354 from its ON position to its OFF position.

The auger-type elevators 57 of apparatus 50 are simple, efficient, and inexpensive. Other forms of elevators can be used in alternate embodiments, such as for example, bucket elevators configured to lift loose granular material from the lower section and deposit it into the tank through, for example, a spout.

Figure 17:
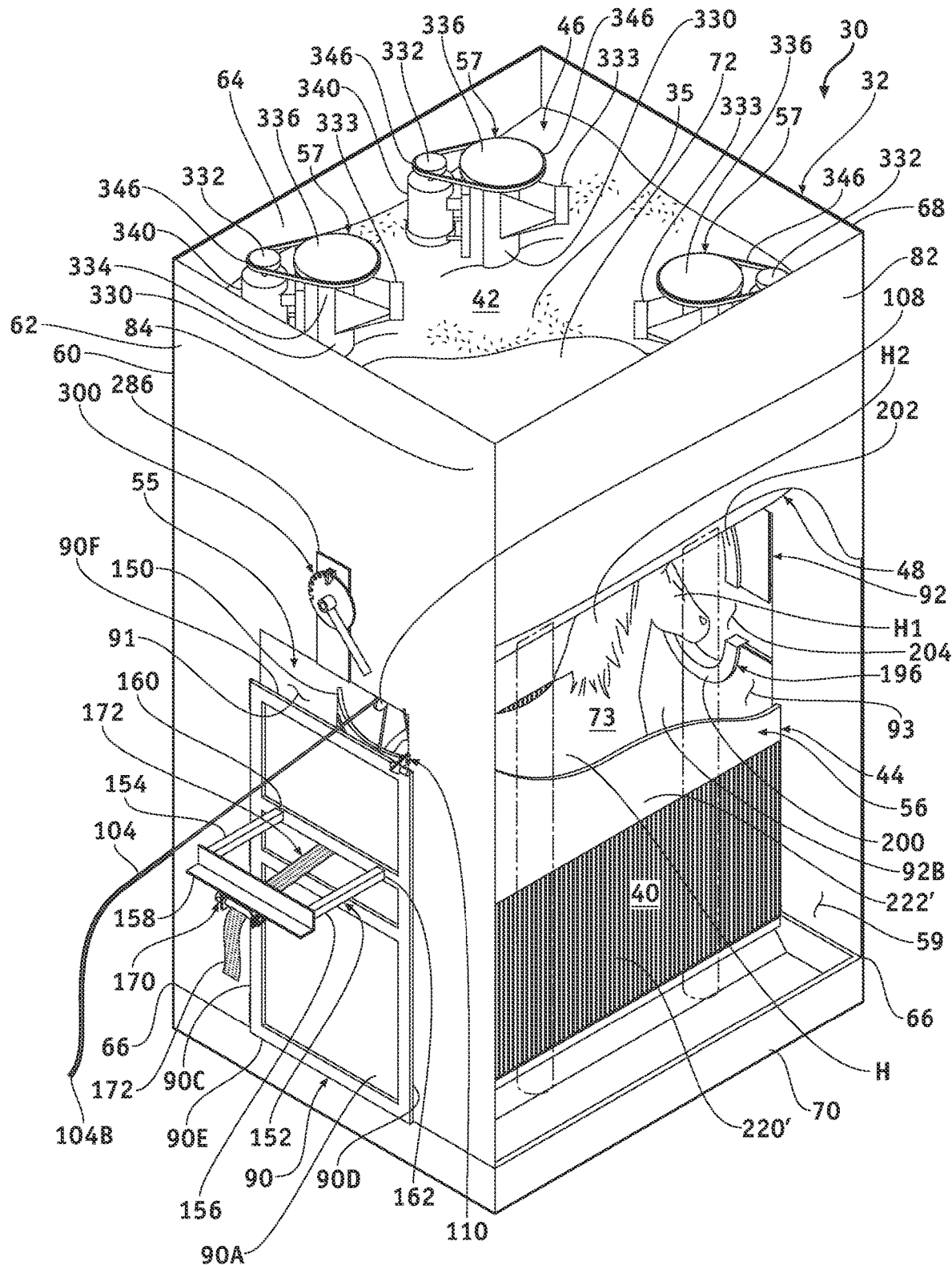
FIG. 17 is a perspective view corresponding to FIG. 16 illustrating the front door closed confining the horse in the stall between the entryway closed by the front door at a front end of the stall and the exitway closed by the back door at a back end of the stall, and the goading fixture in its retracted position in the stall between the closed front door and the horse.
Figure 18:
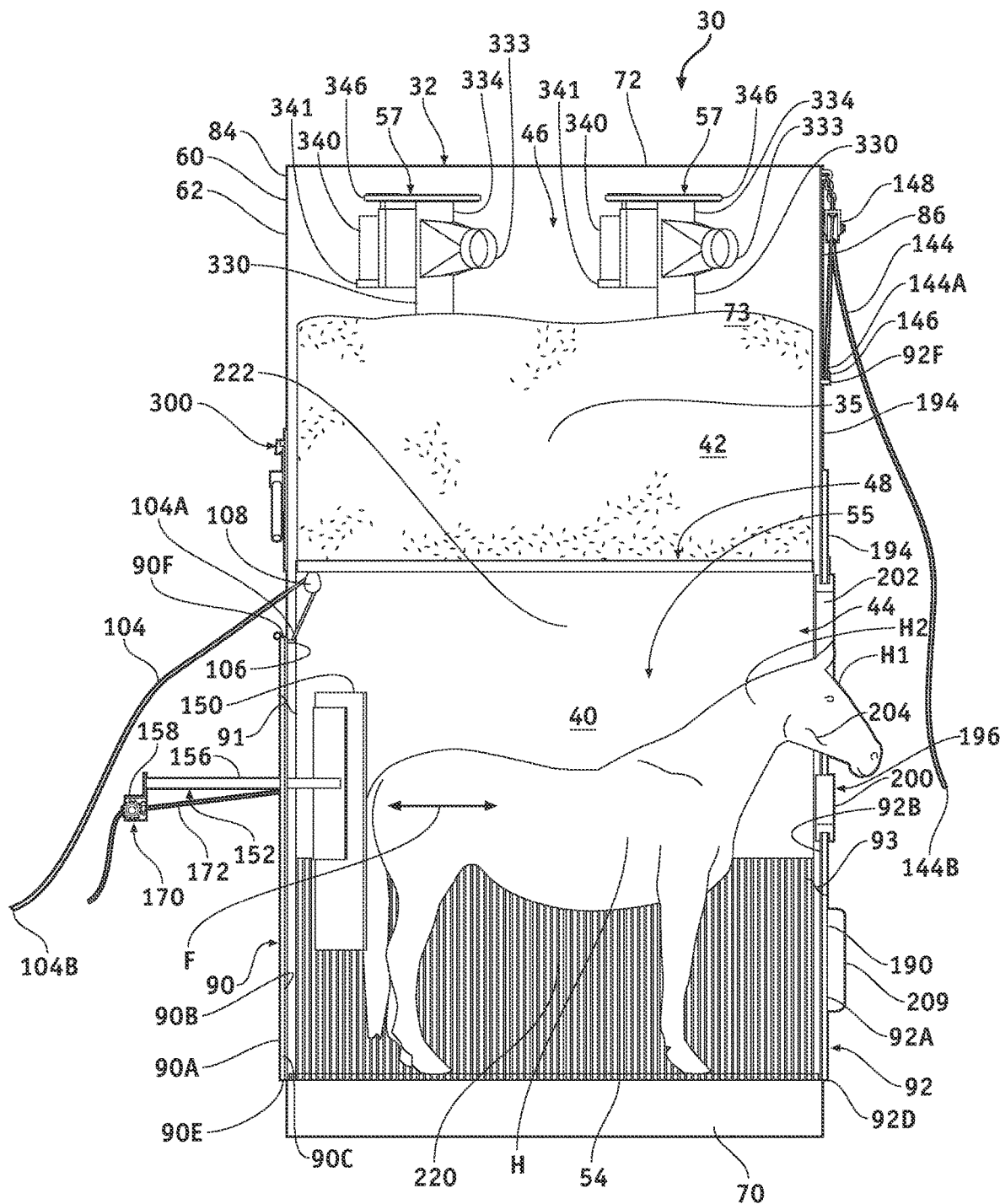
FIG. 18 is a partial cross-section side elevation view corresponding to FIG. 17 illustrating the horse's head extending partially through the open head restraint of the back door.
Figure 19:
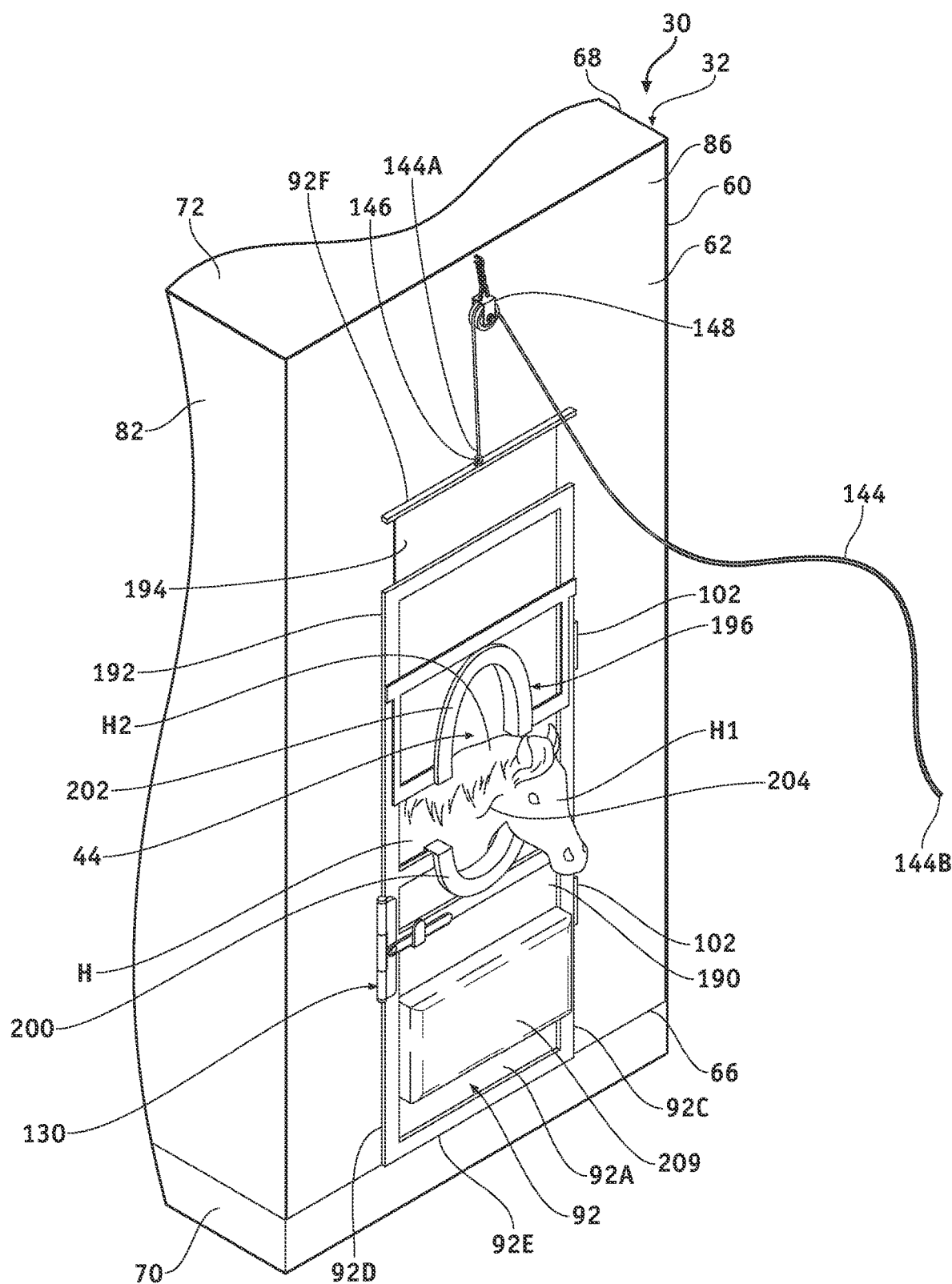
FIG. 19 is a fragmentary perspective view of the apparatus corresponding to FIG. 19 illustrating the horse's head extending outwardly from the stall through the open head restraint of the back door.

Consistent with the foregoing discussion of apparatus 50, reference to which may be made in accordance with the ensuing discussion, apparatus 50 is used as follows. In FIG. 14, front door 90 is open opening entryway 91 to stall 44, back door 92 is closed closing exitway 93 from stall 44, and head restraint 196 is open, also shown in FIG. 15. At the direction of a trainer, horse H is ushered into stall 54 head H1 first through open entryway 91 in FIG. 14 to atop platform 54 between side walls 55 and 56 in FIG. 16, and front door 90 is closed behind him with reference to FIGS. 17 and 18. FIG. 17 illustrates front door 90 closed confining horse H standing in stall 44 between entryway 91 closed by front door 90 at the front end of stall and exitway 93 closed by back door 92 at the back end of stall 44, and goading fixture 130 adjusted to its retracted position in stall 44 between closed front door 90 and the back end of horse H in preparation for being adjusted to its extended position for goading horse H forward toward back door 92 for consolidating horse H between goading fixture 150 and back door 92. Goading fixture 130 is advanced toward back door 92 by pushing push bar/member 158 from its retracted position on FIG. 18 to its extended position away from closed front door 90 and toward closed back door 92 against the back end of horse H, which goads it forwardly toward back door 92 causing its head H1 to pass through area 204 defined by open head restraint 196 in FIGS. 18 and 19. Head restraint 196 is then closed in FIGS. 20, 21, and 22 around neck H2 of horse H thereby securing its head H1 in FIG. 21. Ratchet strap 170 in its secured or engaged position disables goading fixture 150 from moving toward its retracted position while it is being advanced toward its extended position toward back door 92 to facilitate an efficient and safe consolidation of horse H between goading fixture 150 and back door 92, which restrains horse H from backing up in stall 44 toward front door 90 from being advanced through stall 44 toward back door 92. At this stage, horse H is standing atop floor 54 of stall 44 between side walls 55 and 56 consolidated from buttocks to breast between goading fixture 150 and back door 92 with its head H1 extending outwardly from and secured by head restraint 196 closed around its neck H2, tank 35 is charged with material 35, having been previously filled with material 35 having been deposited therein through hatch 74, and hoppers 50 and 52 are closed confining material 35 in tank 46. Padding 209 under head restraint 196 absorbs the impact of head H1 of horse H in the event horse H bucks his head downwardly toward outer side 92A of lower panel 190 preventing horse H from hurting himself. Material 35 is released into lower section 40 of housing 32 from above stall 44 by concurrently opening hoppers in FIG. 23. In response to concurrently opening hoppers 50 and 52 in FIG. 23 from being closed in FIG. 22, the granular 35 falls rapidly by gravity directly into stall 44 along the side walls 55 and 56 rapidly, within about 5-10 seconds, filling stall 44 with material 35 in an amount sufficient to cover and thereby immobilize at least a portion of horse H in FIGS. 24, 25, and 26 within the material 35, while also preventing material 35 from falling directly onto the back of horse H standing in stall 44 between its opposed sides defined by side wall 55 and 56 in FIG. 23 to prevent horse H from being unnecessarily startled. Again, when material 35 is released into stall 44 from dispensing openings 234 and 234', the outwardly opened doors 236A and 236A' direct the flow of material 35 outwardly against the respective dividing walls 222 and 222', which confine the falling material 35 in stall 44 until it reaches grates 220 and 220'. The material 35 falling downwardly along grates 220 and 220' sufficiently fills stall 44 with material 35, confined between closed front door 90 and closed back door 92, for covering and immobilizing at least a portion of a horse H standing and confined in stall 44 in FIGS. 24, 25, and 26, in which neck H2 of horse H extending through opening 206A of head restraint 196 sufficiently plugs opening 206A preventing material 35 from spilling outwardly therethrough from stall 44. Preferably, the amount of material 35 is sufficient to cover the body of horse H standing in stall 4 up its neck H2 for suitably immobilizing horse H in material 35. At the same time, the excess material 35 flows by gravity outwardly from stall 44 through the respective grates 220 and 220' under dividing walls 222 and 222' and into the respective collection chambers 58 and 59 partially filling them in FIG. 24. The material 35 also flows through the grate floor 54 into base 70 of housing 32 open to the respective collection chambers 58 and 59.

Figure 21:
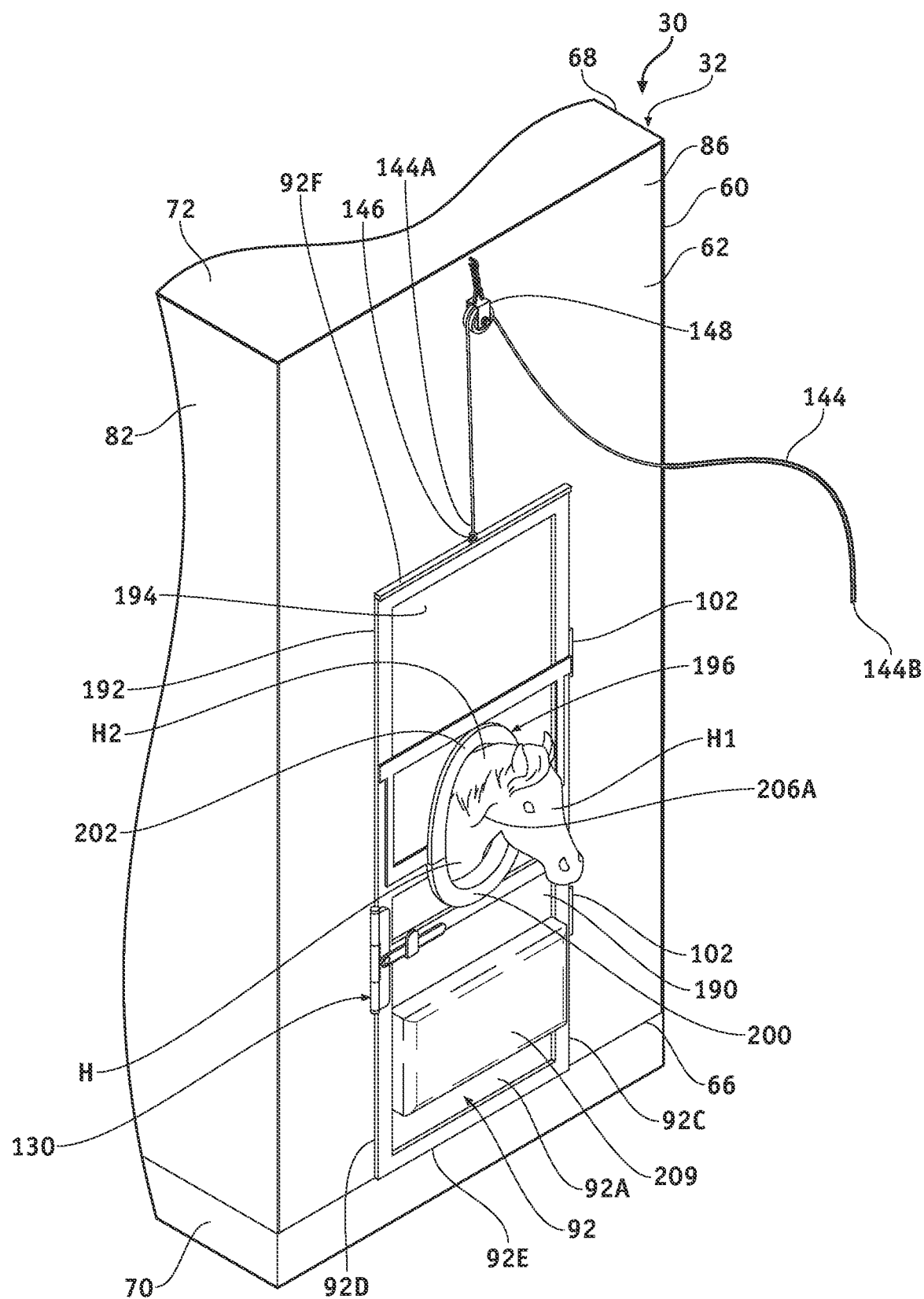
FIG. 21 is a view similar to FIG. 20 illustrating the head restraint of the back door closed around the horse's neck thereby securing the horse's head.
Figure 22:
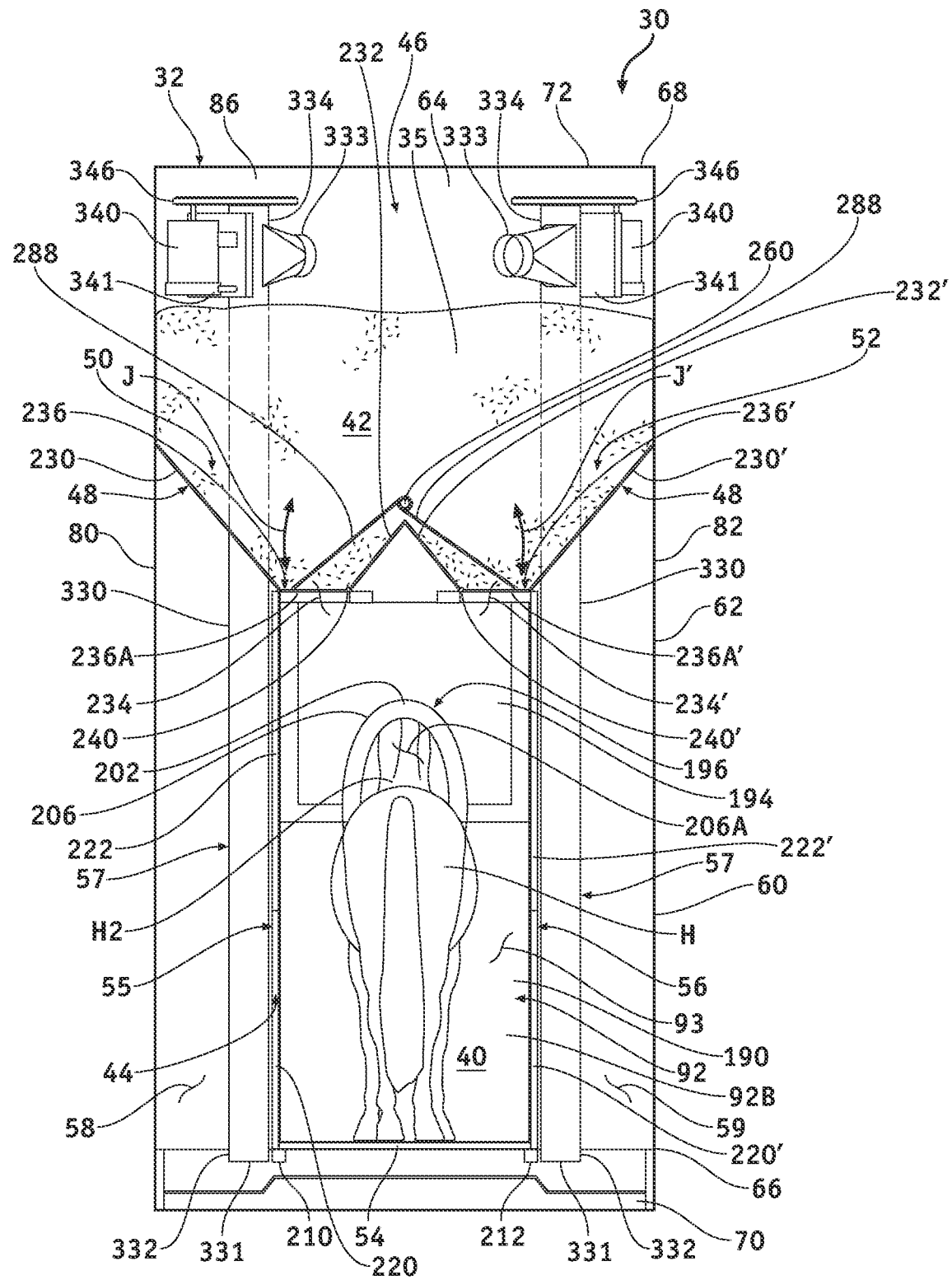
FIG. 22 is a partial cross-section end elevation view corresponding to FIG. 21 illustrating the horse standing in the stall, the head restraint of the back door closed around the horse's neck, and the tank illustrated in FIGS. 7 and 8 charged with loose granular material.
Figure 23:
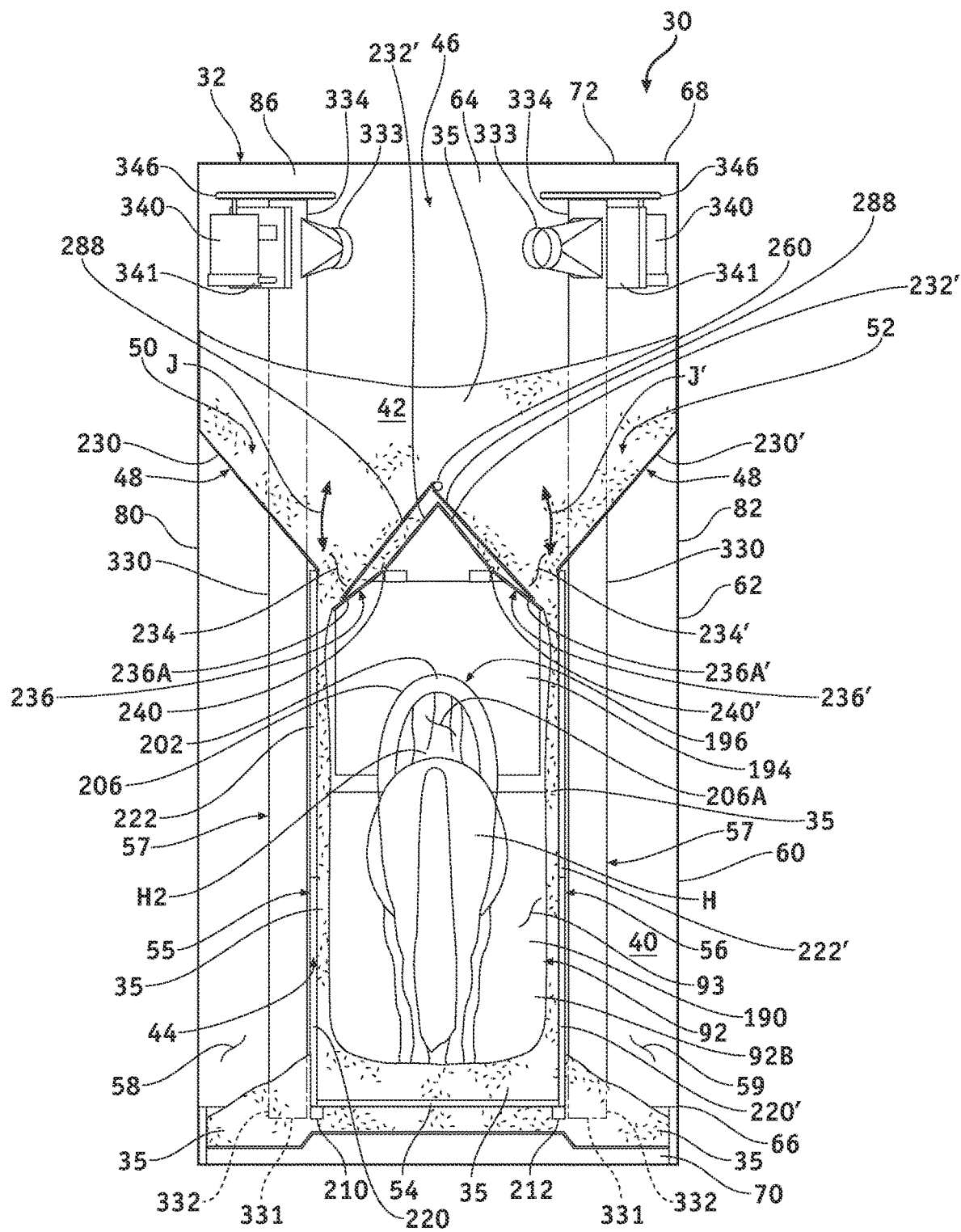
FIG. 23 is a view corresponding to FIG. 22 illustrating the hoppers open releasing the loose granular material into the lower section of the housing from above the stall.

At this stage, a trainer may approach head H1 of horse H extending outwardly through head restraint 196 in FIG. 21 to interact with horse H while is confined in stall 44 and immobilized therein by being submerged in material 35 preventing horse H from bucking and shifting in stall 44. A trainer's interaction with horse for a duration, such as five minutes, ten minutes, twenty minutes, thirty minutes, or other chosen duration, enables the trainer to safely desensitize horse H to human interaction for breaking or taming purposes. Upon the close of a chosen training session, hoppers 50 and 52 are closed in FIG. 27, elevators 57 are activated by switching switch 354 to its ON position to evacuate lower section 40, including stall 44, of the material 35 and recirculate it back to tank 46 in FIGS. 22 and 29 to release or free horse H from material 35, elevators 57 are deactivated by switching switch 354 to its OFF position, head restraint 196 is opened in FIG. 20 from being closed in FIG. 21 to release head H1 of horse H, back door 92 is opened in FIG. 29 opening exitway 93 from stall 44, and horse H is escorted out of the open exitway 93. This entire process is repeated with horse H, as needed, or any chosen horse as desired.

The present invention is described above with reference to illustrative embodiments. However, those skilled in the art will recognize that changes and modifications may be made in the described embodiments without departing from the nature and scope of the present invention. Various further changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. An apparatus for training horses, comprising:
    a housing comprising a lower section under an upper section;
    the lower section comprising a stall for confining a horse, the stall including a first side and a second side;
    the upper section comprising hoppers for loose granular material, the hoppers comprising a first hopper proximate to the first side and a second hopper proximate to the second side, the first hopper including a first closure, the second hopper including a second closure, the first closure and the second closure openable for releasing the loose granular material into the lower section from the first hopper and the second hopper along the first side and the second side, respectively, for sufficiently filling the stall with the loose granular material for covering at least a portion of the horse;

an adjustment member mounted to the housing for turning between a hold position and a release position, the adjustment member mechanically coupled to the first closure and the second closure, the first closure and the second closure concurrently closed when the adjustment member is in the hold position and enabled to concurrently open to respective open positions when the adjustment member is moved to the release position from the hold position; and a latch operatively coupled between the housing and the adjustment member, the latch configured to secure the adjustment member in the hold position and release the adjustment member from the hold position and comprising a disk extending radially outward from a hub affixed to the adjustment member to a perimeter edge configured with a catch, and a plunger mounted to the housing for pivotal movement between a first position received by the catch, securing the adjustment member in the hold position, and a second position released from the catch, releasing the adjustment member from the hold position.

2. The apparatus according to claim 1, further comprising a handle affixed to and extending radially outward from the hub, the handle configured to turn with the adjustment member and strike the plunger when the plunger is in the second position, arresting the adjustment member from turning beyond the release position.

3. The apparatus according to claim 1, further comprising the adjustment member mechanically coupled to the first closure and the second closure by at least one coupling being elongate and flexible and unwinding and winding relative to the adjustment member in response to the adjustment member turning between the hold position and the release position, the first closure and the second closure concurrently closed when the adjustment member is in the hold position and enabled to concurrently open when the adjustment member is moved to the release position from the hold position.

4. An apparatus for training horses, comprising:
a housing comprising a lower section under an upper section;
the lower section configured with a stall for confining a horse, the stall including a first side and a second side;
the upper section including a tank for loose granular material and configured with hoppers, the hoppers comprising a first hopper proximate to the first side and a second hopper proximate to the second side, the first hopper including a first dispensing opening and a first closure, the second hopper including a second dispensing opening and a second closure, the first closure and the second closure movable between closed positions closing the first dispensing opening and the second dispensing opening, respectively, for confining the loose granular material in the tank and open positions opening the first dispensing opening and the second dispensing opening, respectfully, for allowing the loose granular material to empty through the first dispensing opening and the second dispensing opening into the lower section along the first side and the second side, respectively, for sufficiently filling the stall with the loose granular material for covering at least a portion of the horse;

an adjustment member mounted to the housing for turning between a hold position and a release position, the adjustment member mechanically coupled to the first closure and the second closure, the first closure and the second closure in said closed positions when the adjustment member is in the hold position and enabled to concurrently move to said open positions from said closed positions when the adjustment member is moved to the release position from the hold position; and a latch operatively coupled between the housing and the adjustment member, the latch configured to secure the adjustment member in the hold position and release the adjustment member from the hold position and comprising a disk extending radially outward from a hub affixed to the adjustment member to a perimeter edge configured with a catch, and a plunger mounted to the housing for pivotal movement between a first position received by the catch, securing the adjustment member in the hold position, and a second position released from the catch, releasing the adjustment member from the hold position.

5. The apparatus according to claim 4, further comprising a handle affixed to and extending radially outward from the hub, the handle configured to turn with the adjustment member and strike the plunger when the plunger is in the second position, arresting the adjustment member from turning beyond the release position.

6. The apparatus according to claim 4, further comprising the adjustment member mechanically coupled to the first closure and the second closure by at least one coupling being elongate and flexible and unwinding and winding relative to the adjustment member in response to the adjustment member turning between the hold position and the release position, the first closure and the second closure in said closed positions when the adjustment member is in the hold position and enabled to concurrently move to said open positions from said closed positions when the adjustment member is moved to the release position from the hold position.

* * * * *